US010994847B2

(12) United States Patent
Simpson

(10) Patent No.: US 10,994,847 B2
(45) Date of Patent: May 4, 2021

(54) SEAT TRACKS WITH COMPOSITE FRAMES

(71) Applicant: The Boeing Company, Chicago, IL (US)

(72) Inventor: Khambrel A. Simpson, Miami, FL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/723,907

(22) Filed: Dec. 20, 2019

(65) Prior Publication Data
US 2020/0148365 A1 May 14, 2020

Related U.S. Application Data

(63) Continuation of application No. 14/952,777, filed on Nov. 25, 2015, now Pat. No. 10,556,691.

(51) Int. Cl.
B64D 11/06 (2006.01)
B60N 2/005 (2006.01)
(Continued)

(52) U.S. Cl.
CPC .......... *B64D 11/0696* (2013.01); *B29C 65/48* (2013.01); *B29C 65/56* (2013.01);
(Continued)

(58) Field of Classification Search
CPC ...................................................... B32B 5/12
(Continued)

(56) References Cited

U.S. PATENT DOCUMENTS 4,776,533 A 10/1988 Sheek et al.
6,110,567 A * 8/2000 Bird .......................... B32B 3/28
428/178
(Continued)

FOREIGN PATENT DOCUMENTS

CN 103358957 A 10/2013
CN 104385559 A 3/2015
(Continued)

OTHER PUBLICATIONS

Brazilian Application Serial No. 102016025327, Office Action dated Jun. 16, 2020, 6 pgs.
(Continued)

*Primary Examiner* — Brent T O'Hern
(74) *Attorney, Agent, or Firm* — Kwan & Olynick LLP

(57) ABSTRACT

Provided are seat tracks comprising composite frames and methods of fabricating such seat tracks. A composite frame comprises two sets of fibers having different orientations. The first fibers may extend parallel to the principal axis of the track, while the second fibers may extend within planes perpendicular to that axis. Various characteristics of these fibers may be specifically selected such that the mechanical strength of the frame in the principal axis direction is greater than other directions. In other words, the composite frame may have anisotropic properties. This difference ensures that adequate support is provided during both normal conditions and extreme conditions. Specifically, during the normal operating conditions, most loads may be directed vertically, while at the extreme conditions most loads may be directed horizontally. Aligning the fiber orientation of the composite frame with various directions of expected load allows forming a very light yet sufficiently supportive seat track.

20 Claims, 17 Drawing Sheets

(51) Int. Cl.
  *B29C 70/30* (2006.01)
  *B29C 65/48* (2006.01)
  *B29C 65/62* (2006.01)
  *B29C 65/56* (2006.01)
  *B64C 1/18* (2006.01)
  *B60N 2/015* (2006.01)
  *B29L 31/30* (2006.01)
  *B29L 31/00* (2006.01)

(52) U.S. Cl.
  CPC .............. *B29C 65/62* (2013.01); *B29C 70/30* (2013.01); *B60N 2/005* (2013.01); *B60N 2/015* (2013.01); *B64C 1/18* (2013.01); *B29L 2031/3076* (2013.01); *B29L 2031/771* (2013.01); *Y02T 50/40* (2013.01)

(58) Field of Classification Search
  USPC ........................................................ 428/131
  See application file for complete search history.

(56) References Cited

U.S. PATENT DOCUMENTS

| | | | |
|---|---|---|---|
| 10,556,691 B2* | 2/2020 | Simpson | .................. B64C 1/18 |
| 2005/0156095 A1 | 7/2005 | Vichniakov et al. | |
| 2006/0038071 A1 | 2/2006 | Schoene | |
| 2012/0235011 A1 | 9/2012 | Roy et al. | |
| 2017/0144765 A1 | 5/2017 | Simpson | |

FOREIGN PATENT DOCUMENTS

| | | | |
|---|---|---|---|
| EP | 1524106 A1 | 4/2005 | |
| FR | 2864940 A1 | 7/2005 | |
| WO | 0134381 A1 | 5/2001 | |
| WO | 2005018926 A2 | 3/2005 | |

OTHER PUBLICATIONS

Canadian Application Serial No. 2,946,394, Office Action dated Jul. 15, 2020, 5 pgs.
Australian Application Serial No. 2016228282, Office Action dated Sep. 21, 2020, 6 pgs.
"U.S. Appl. No. 14/952,777, Notice of Allowance dated Sep. 27, 2019", 8pgs.
"U.S. Appl. No. 14/952,777, Restriction Requirement dated Jan. 11, 2019", 6 pgs.
"U.S. Appl. No. 14/952,777, Restriction Requirement dated May 28, 2019", 7 pgs.
"Canadian Application Serial No. 2,946,394, Office Action dated Sep. 23, 2019", 4 pgs.
"European Application Serial No. 16198662.5, Office Action dated Dec. 10, 2019", 6 pgs.
"European Application Serial No. 16198662.5, Search Report dated Apr. 6, 2017", 7 pgs.
Potter, K. D. et al., "Heavily Loaded Bonded Composite Structure: Design, Manufacture and Test of 'I' Beam Specimens", Composite Structures, vol. 51, Issue 4, Apr. 2001, pp. 389-399.
Japanese Application Serial No. 2016-217817, Office Action dated Oct. 6, 2020, 4 pgs.
European Application Serial No. 16198662.5, Office Action dated Dec. 3, 2020, 4 pgs.
Chinese Application Serial No. 2016110442750, Office Action dated Dec. 25, 2020, 22 pgs.

\* cited by examiner

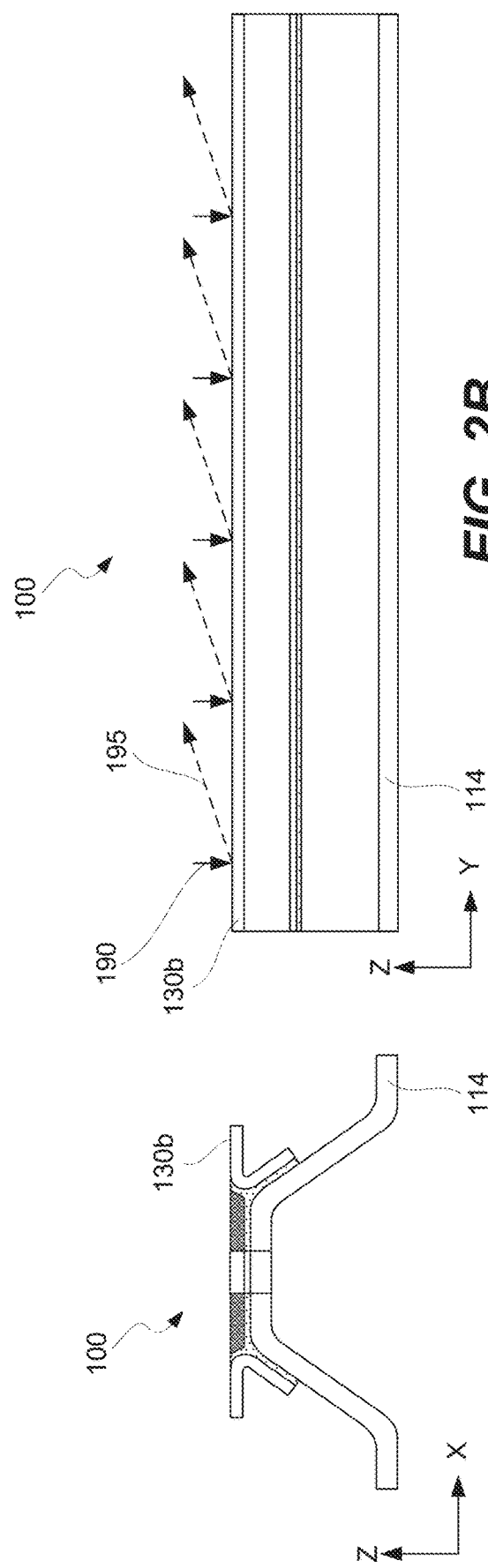
FIG. 2A
FIG. 2B
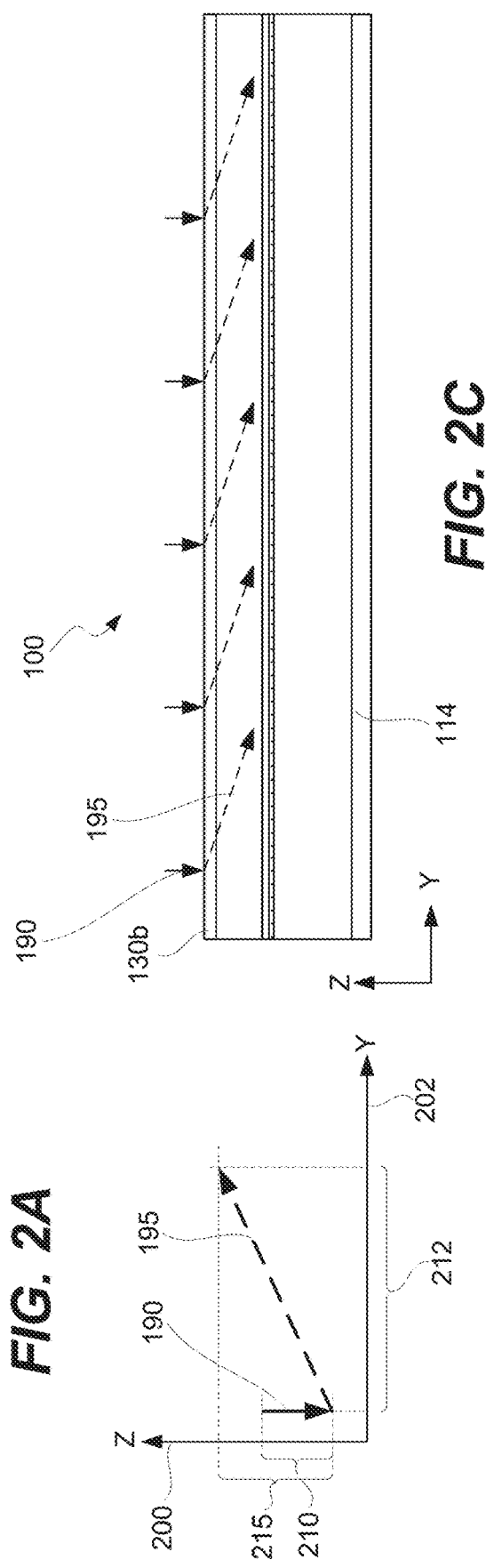
FIG. 2C
FIG. 2D

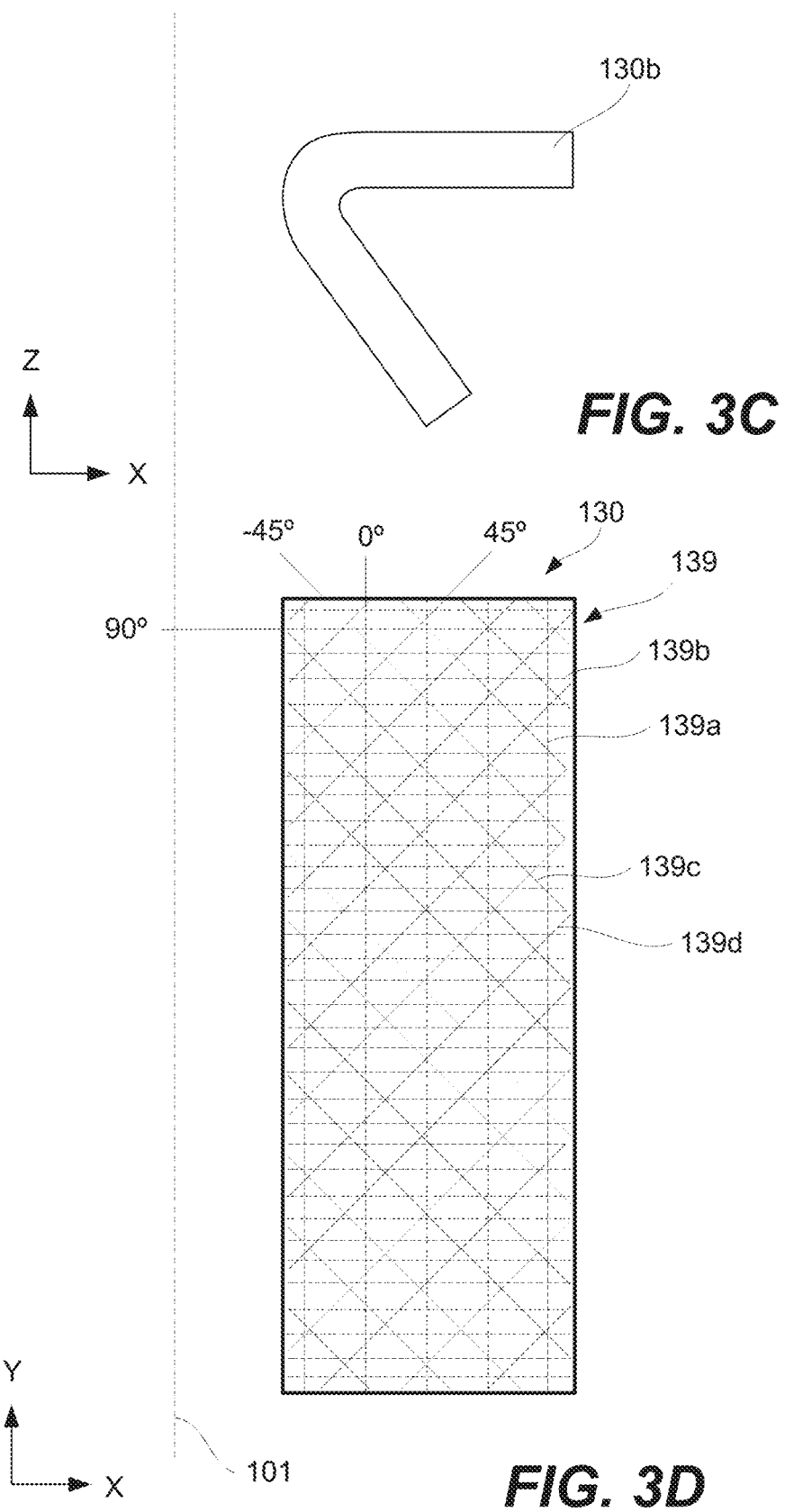

SEAT TRACKS WITH COMPOSITE FRAMES

CROSS-REFERENCE TO RELATED APPLICATION

This application is a continuation of U.S. patent application Ser. No. 14/952,777, entitled "SEAT TRACKS WITH COMPOSITE FRAMES," filed on 25 Nov. 2015, which is incorporated herein by reference in its entirety for all purposes.

BACKGROUND

Conventional seat tracks used in aircraft and other vehicles having multiple seats arranged in rows are typically made from metals, such as steel, aluminum, or titanium. Individual metal components may be formed by stamping, extrusion, die cutting, and other metal processing techniques. Different metal components of the same seat track may be then welded together into a final assembly. Composite structures are not used for seat tracks because of significant loads experienced by seat tracks during extreme operating conditions, such as during emergency landing of an aircraft. Furthermore, seat tracks generally have multiple large openings that allow seats being positioned at different locations. These openings cause fiber discontinuities in composites. Conventional metal seat tracks also have sharp corners and tight radii that cannot be replicated with composite materials without substantial efforts. Yet, metals have isotropic mechanical properties, which less desirable for structures experiencing substantially different loads in different directions, such as seat tracks. Composite structures may be formed with anisotropic properties, which may be specifically tailored to specific loads.

SUMMARY

Provided are seat tracks comprising composite frames and methods of fabricating such seat tracks. A composite frame comprises two sets of fibers having different orientations. The first fibers may extend parallel to the principal axis of the track, while the second fibers may extend within planes perpendicular to that axis. Various characteristics of these fibers may be specifically selected such that the mechanical strength of the frame in the principal axis direction is greater than other directions. In other words, the composite frame may have anisotropic properties. This difference ensures that adequate support is provided during both normal conditions and extreme conditions. Specifically, during the normal operating conditions, most loads may be directed vertically, while at the extreme conditions most loads may be directed horizontally. Aligning the fiber orientation of the composite frame with various directions of expected load allows forming a very light yet sufficiently supportive seat track.

In some embodiments, a seat track comprises a composite frame. The seat track may also comprise a reinforcement component attached to the composite frame. The composite frame comprises first fibers and second fibers. The composite frame may also comprise a resin matrix bound to the first fibers and to the second fibers. The first fibers may extend parallel to the principal axis of the seat track. The second fibers may extend within planes perpendicular to the principal axis. The mechanical strength or, more specifically, the tensile strength of the composite frame in the direction of the principal axis may be greater than that of the composite frame in any other direction or, more specifically, in any direction within the planes perpendicular to the principal axis. This strength difference may be provided by various differences in the first fibers and second fibers.

In some embodiments, the average fiber density of the first fibers within the composite frame may be greater than the average fiber density of the second fibers within the composite frame. In other words, on average, there will be more of the first fibers in a unit volume than there will the second fibers. The ratio of the average fiber density of the first fibers to the average fiber density of the second fibers may be between about 2 and 20 or, more specifically, between 3 and 10. For example, considering all fibers present in the composite frame, the first fibers may represent at least about 40% of all fibers or, more specifically, at least about 50% or even at least about 60%. The second fibers may represent less than about 30% or, more specifically, less than about 20% or even less than about 10%.

In some embodiments, the average diameter of the first fibers is greater than the average diameter of the second fibers. Furthermore, the first fibers may be made from a material that is different than the material of the second fibers. For example, the material of the first fibers may have a higher tensile strength than the material of the second fibers.

In some embodiments, the first fibers and the second fibers are unevenly distributed throughout a thickness of the composite frame. For example, the composite frame may be formed from a laminate of different plies such than one or more of these plies comprise the first fibers and one or more other plies comprise the second fibers. The distribution of the first fibers and the second fibers throughout the thickness may be determined by the arrangement of the plies within the layup.

In some embodiments, the majority, such as greater than 50%, of the first fibers is substantially straight. This majority may be straight despite the composite frame having a non-planar shape, e.g., a height greater than the sheet thickness of the composite frame. Furthermore, the majority of the first fibers may extend substantially the entire length of the composite frame. Some of the first fibers may be interrupted by various openings in the composite frame.

The second fibers may be curved within the planes perpendicular to the principal axis. A portion of the second fibers may extend continuously between a first flange end and a second flange end of the composite frame. This portion may not be interrupted by any openings in the composite frame.

In some embodiments, the composite frame further comprises third fibers disposed at an angle of between about 30° to 60° relative to the first fibers and at an angle of between about 30° to 60° relative to the second fibers. The average fiber density of the third fibers within the composite frame is less than an average fiber density of the first fibers within the composite frame. Furthermore, the average fiber density of the third fibers within the composite frame may be greater than an average fiber density of the second fibers within the composite frame.

In some embodiments, the composite frame further comprises fourth fibers disposed at an angle of between about 30° to 60° relative to the first fibers and at an angle of between about 30° to 60° relative to the second fibers. Furthermore, the fourth fibers may be perpendicular to the third fibers. For example, the fourth fibers and the third fibers may be parts of the same ply used to form the composite frame or, more specifically, may be parts of the same woven fabric. The average fiber density of the fourth fibers within the composite frame is less than an average fiber density of the first fibers within the composite frame.

Furthermore, the average fiber density of the fourth fibers within the composite frame may be greater than an average fiber density of the second fibers within the composite frame. Finally, the average fiber density of the third fibers within the composite frame may be substantially the same as the average fiber density of the third fibers within the composite frame.

In some embodiments, the composite frame comprises a bottom support flange, a top portion, and a leg portion extending between the bottom support flange and the top portion. The bottom support flange may be substantially parallel to the top portion connected to the reinforcement component. The angle between the top portion and the leg portion may be between 100° and 120°. In some embodiments, the bottom support flange, the top portion, and the leg portion are monolithic. In these embodiments, a portion of the second fibers may extend continuously between the bottom support flange, the top portion, and the leg portion. At the same time, a portion of the first fibers extending within the bottom support flange may not extend within the top portion or the leg portion. Likewise, a portion of the first fibers extending within the top portion may not extend within the bottom support flange or the leg portion.

In some embodiments, the composite frame and the reinforcement component comprises a plurality of openings extending through both the composite frame and the reinforcement component. The plurality of openings may interrupt a portion of the first fibers and a portion of the second fibers of the composite frame. The plurality of openings may be arranged in a row along the principal axis of the seat track.

In some embodiments, the seat track comprises composite floor supports attached to the composite frame. For example, the composite floor supports may be attached on opposite sides of the reinforcement component. The composite floor supports may comprise first fibers extending parallel to the principal axis. The composite floor supports may also comprises second fibers extending within the planes substantially perpendicular to the principal axis. The first fibers and the second fibers of the composite floor supports should not be confused with the first fibers and the second fibers of the composite frame.

In some embodiments, the mechanical strength or, more specifically, the tensile strength of the composite floor supports in the direction parallel to the principal axis is less than that of the composite floor supports in the direction within the planes substantially perpendicular to the principal axis. The average fiber density of the first fibers of the composite floor supports may be less than the average fiber density of the second fibers of the composite floor supports. For example, the ratio of the average fiber density of the second fibers of the composite floor supports to the average fiber density of the first fibers of the composite floor supports is between about 2 and 20 or, more specifically, between 3 and 10. In some embodiments, the top surfaces of the composite floor supports are coplanar with a top surface of the reinforcement component. In some embodiments, the composite floor supports are attached to the composite frame using adhesive. The composite floor supports may be further attached to the composite frame using stitching. Alternatively, the reinforcement component may be operable as floor supports and no additional components are used as floor supports.

In some embodiments, the reinforcement component is attached to the composite frame using adhesive. The reinforcement component may be a non-composite component. For example, the reinforcement component may comprise metal, such as aluminum or titanium.

Also provided is a method of forming a seat track. The method may involve forming a composite frame having a non-planar shape. The composite frame may comprise first fibers and second fibers in a resin matrix. The first fibers may extend parallel to the principal axis of the seat track. The second fibers may extend within planes perpendicular to the principal axis of the seat track. The mechanical strength or, more specifically, the tensile strength of the composite frame in the direction of the principal axis may be greater than that of the composite frame in any direction within the planes perpendicular to the principal axis. The method also comprises attaching a reinforcement component to the composite frame.

Attaching the reinforcement component to the composite frame may comprise applying an adhesive between the reinforcement component and the composite frame followed by curing the adhesive between the reinforcement component and the composite frame. The adhesive may be cured at the same time as curing the composite frame.

In some embodiments, forming the composite frame comprises forming a frame layup using multiple plies. One of the multiple plies may comprise the first fibers, while another one of the multiple plies may comprise second fibers. Furthermore, forming the composite frame may comprises during the frame layup.

In some embodiments, the method comprises forming a plurality of frame openings through the composite frame. The plurality of frame openings may be formed after attaching the reinforcement component to the composite frame. For example, the plurality of reinforcement component openings may be used as anvils while forming the plurality of frame openings. Alternatively, the plurality of reinforcement component openings and the plurality of frame openings are formed in a same operation.

Also provided is a method of supporting a seat using a seat track. The method may comprise distributing a load from the seat to a reinforcement component and a composite frame of the seat track. The reinforcement component and the composite frame may be coupled together during the load distribution. The reinforcement component may comprise a metal. The composite frame may comprise a first fibers and a second fibers having different direction than the first fibers. The load may be generated during various operations of the seat, which may involve standard operation (e.g., supporting the weight of the passengers) and non-standard operations (e.g., emergency landing). The load may be different during different operations. In some embodiments, the method further comprises flowing the load from the seat to an aircraft support beam through the composite frame.

In some embodiments, the method further comprises conveying the load from the reinforcement component through a planar top portion of the composite frame, a leg portion of the composite frame, and a bottom support portion of the composite frame to a aircraft support beam connected to the bottom support portion. This operation may be a part of distributing the load from the seat to the reinforcement component and the composite frame of the seat track.

In some embodiments, the method further comprises sizing a corner radius of the composite frame to decrease areas of stress concentration. The corner radius of the composite frame may be at least about 0.25 inches, such as about 0.5 inches. While larger radii are desirable for composite structures to prevent buckling, delamination, fiber discontinuity and other negative effects, the corner radius of the composite frame may be kept at about 0.5 inches or less to ensure compactness and, as a result, light weight of the composite frame.

In some embodiments, the method further comprises reacting a fastener compressive force with the reinforcement component. This operation may be a part of fastening the seat to the seat track or, more specifically, to the reinforcement component and the composite frame of the seat track, which may be coupled together during this fastening operation or prior to that.

In some embodiments, the method further comprises transitioning from a planar top portion of the composite frame to a leg portion of the composite frame with a first radius. The method may also comprise transitioning from the leg portion of the composite frame to a bottom support portion of the composite frame with a second radius. The first radius may be at least about 0.25 inches, such as about 0.5 inches. The second radius may be at least about 0.25 inches, such as about 0.5 inches. As noted above, while larger radii are desirable for composite structures to prevent buckling, delamination, fiber discontinuity and other negative effects, the first radius and/or the second radius of the composite frame may be kept at about 0.5 inches or less to ensure compactness and, as a result, light weight of the composite frame.

In some embodiments, the method may further comprise angling a leg portion of the composite frame relative to a top planar portion of the composite frame to place more fibers of the second fibers along the load or, more specifically, along the direction of the expected load, especially, the maximum expected load. For example, the seat track may be designed to support the most load in the axial direction, followed by the load in the vertical direction, and some side load. A combination of the vertical load and the side load may be used for determining the angle between the leg portion and the top planar portion, which may be between about 100° and 120°, such as about 110°.

In some embodiments, the method further comprises locating the reinforcement component above the composite frame. Furthermore, this operation may involve locating the reinforcement component between two composite floor supports. The floor supports may be used to carry the load from the floor, which may be different from the load onto the seta.

In some embodiments, the method further comprises aligning one or more plies comprising the first fibers having 0° orientation relative to a principal axis of the seat track. Specifically, the one or more plies are aligned to ensure this 0° orientation of the first fibers in the composite frame. Likewise, the method may comprise aligning one or more plies comprising the second fibers having 90° orientation relative to a principal axis of the seat track. The one or more plies comprising the second fibers may be different from the one or more plies comprising the first fibers. As such, the orientation of the first fibers may be performed independently from the orientation of the second fibers.

In some embodiments, the method further comprises cantilevering a composite floor support from the composite frame. The floor support may be attached to the composite frame by one or more techniques described in this disclosure. Furthermore, a portion of the composite frame may be operable as the floor support. In other words, the composite frame and the floor support may be a monolithic structure without a defined interface. For example, the composite frame and the floor support may be formed from the same layup of composite plies.

In some embodiments, the method further comprises bonding the composite floor support to the composite frame. This bonding may comprise applying an adhesive between the composite floor support and the composite frame as well as curing the adhesive. The bonding may comprised stitching the composite floor support to the composite frame in addition or instead of applying the adhesive.

Also provided is a method of attaching a seat to an aircraft support beam. The method comprises fastening the seat to a reinforcement component and a composite frame and fastening the composite frame to the aircraft support beam. The reinforcement component is coupled to the composite frame. The reinforcement component comprises a metal. The composite frame comprises a first fibers and a second fibers having different direction than the first fibers.

The reinforcement component may be coupled to a planar top portion of the composite frame, while the aircraft support beam may be fastened to a bottom support portion of the composite frame. The planar top portion and the bottom support portion may be connected by a leg portion of the composite frame. The first radius of a transition between the planar top portion of the composite frame and the leg portion of the composite frame may be at least about 0.25 inches or, more specifically, about 0.5 inches. The second radius of a transition between the leg portion of the composite frame and the bottom support portion of the composite frame may be at least about 0.25 inches or, more specifically, about 0.5 inches. The leg portion of the composite frame is angled relative to a top planar portion of the composite frame such that more fibers of a first fibers of the composite frame extend along a load transferred from the seat to the aircraft support beam than in any other direction. The angle between the leg portion of the composite frame and the top planar portion of the composite frame may be between about 100° and 120° or, more specifically, about 110°.

These and other embodiments are described further below with reference to the figures.

BRIEF DESCRIPTION OF THE DRAWINGS

FIG. 2A is a schematic cross-sectional view a seat track, in accordance with some embodiments.

FIGS. 2B and 2C are schematic side views of the seat track of FIG. 2A showing different forces applied to the seat track, in accordance with some embodiments.

FIG. 2D shows projections of the forces illustrated in FIG. 2B on different axes including, in accordance with some embodiments.

FIG. 3C is a schematic cross-sectional view a composite floor support used in a seat track, in accordance with some embodiments.

FIG. 3D is a schematic top view of the composite floor support of FIG. 3C, in accordance with some embodiments.

DETAILED DESCRIPTION

Figure 1A:
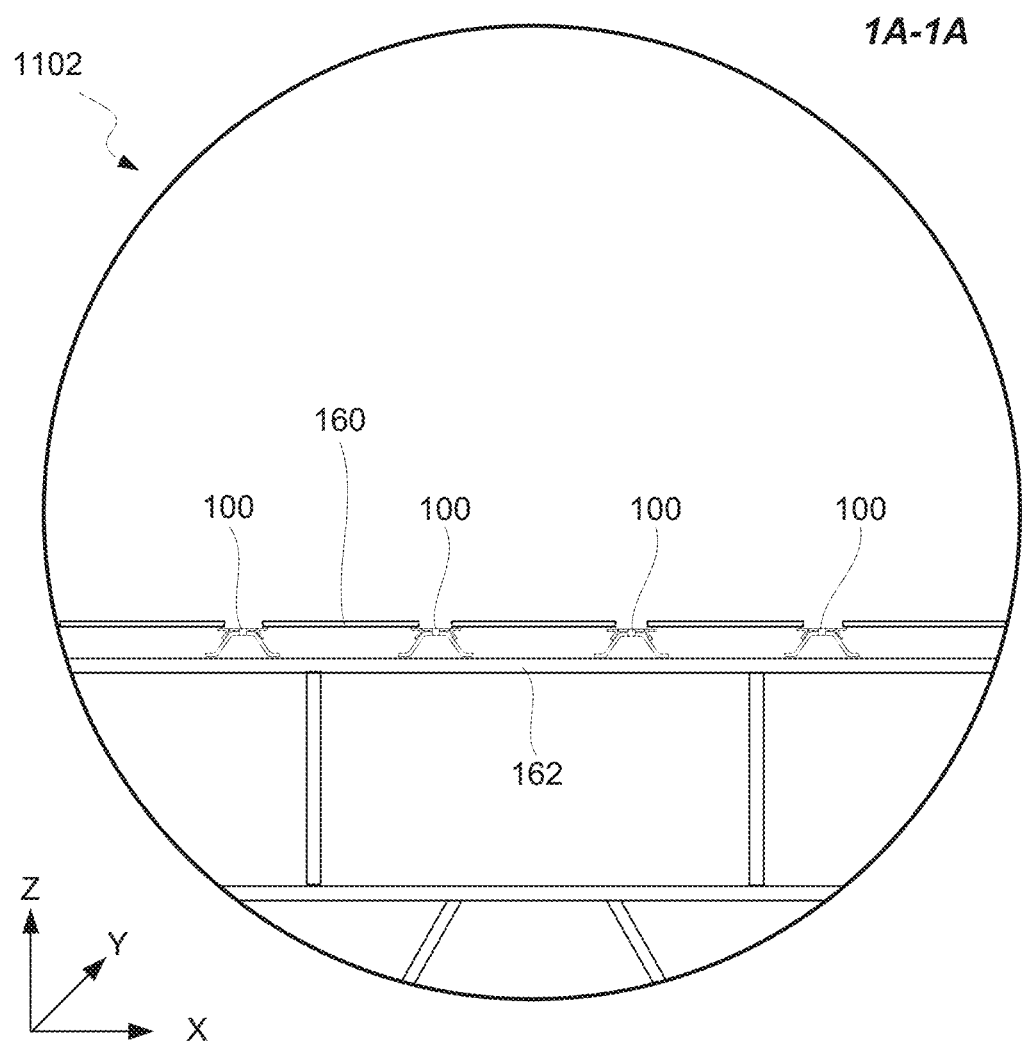
FIG. 1A is a schematic cross-sectional view of an aircraft illustrating floor beams and seat tracks connected to and supported by floor beams, in accordance with some embodiments.

In the following description, numerous specific details are set forth to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting Introduction Traditionally, seat tracks are made from metals, such as aluminum or titanium. However, these metal seat tracks may be heavy and/or may provide less than desire strength for the weight under certain extreme conditions, such as rapid acceleration or deceleration during emergency landing, for example. Metals have inherent isotropic mechanical properties. As such, metal structures may not be ideal for application where different mechanical strengths are needed in different directions, such as seat tracks and, in particular, seat tracks on passenger aircraft. There is an advantage to use materials that can be tailored to the specific expected loadings. Specifically, smaller and lighter structures can be used while providing sufficient support.

While composite materials may be formed with anisotropic properties, direct replacement of metal components with the same design of composite components is often not possible. For example, conventional seat track designs may result in various fiber discontinuities, buckling, and other issues if formed from composite materials. Specifically, the conventional design has an array of large and closely positioned openings used to bolt seats to the tracks. These openings may impact fiber continuity resulting in substantial strength losses along the direction of the fibers. This discontinuity may be particularly problematic when critical loads are applied to the seat tracks. Furthermore, composite seat tracks may not have tight radii, such as sharp corners with the radius of less than 0.125" or even less than 0.25", which would also be difficult for fiber reinforced structures.

Provided are seat tracks comprising composite frames. A composite frame comprises at least two sets of fibers, each set having a different orientation from the other set. The first fibers may extend parallel to the principal axis of the seat track, while the second fibers may extend within planes perpendicular to the principal axis. The direction, type, density, and other characteristics of these fibers are selected based on expected loads on seat tracks. For example, the first fibers may support loads along the principal axis, such as during rapid acceleration or declaration. The second fibers may support the weight of the seats, passengers, floor, and other loads in the vertical orientation. Additional fibers may be present and extend in other directions to ensure, for example, load transfers between different portions of the seat track. The seat track may be formed such that each major surface of the seat track is formed by different plies or even different ply layups. When multiple different layups are used, the components from these layups may be attached to one another using, for example, adhesive and/or stitching. Furthermore, different layups of the same seat track may be cured simultaneously and, in some embodiments, together with curing adhesive. Different composite parts may be also combined together with metal parts. For example, a metal reinforcement component may be used around openings to compensate for discontinuity of fibers.

In some embodiments, a seat track formed predominantly from composite structures may be lighter than a comparable titanium seat track and/or may provide more mechanical support to seats in the directions along the principal axis due to the anisotropic nature of the composite structures. This additional support is important in order to retain the seats in place during extreme conditions, such as during rapid accelerations and decelerations, for example. In some embodiments, the seat track may have a constant cross section to decrease manufacturing complexity and may extend along the principal axis without any bends.

For purposes of this disclosure, a seat track formed predominantly from composite structures may be referred to as a composite seat track. However, one having ordinary skill in the art would understand that this type of a seat track may be include some non-composite materials, such as metals. For example, the seat track may include a metal reinforced component. Furthermore, an adhesive may be used for attaching different composite components to each other and, in some instances, to non-composite components. Finally, a seat track may include multiple different composite components, such that the mechanical properties of these composite components may be different.

To better understand various features of composite seat tracks, FIG. 1A is presented. This figure illustrates one application for the composite seat tracks. Specifically, FIG. 1A is a schematic cross-sectional view of aircraft 1102 illustrating floor beams 162 and seat tracks 100 connected to and supported by floor beams 162, in accordance with some embodiments. This cross-sectional view is schematically identified with arrows 1A-1A in FIG. 9. This schematic cross-sectional view may not be drawn to scale, but rather has some elements exaggerated for clarity. For instance, seat tracks 100 are shown to be much larger than the actual scale. Floor beams 162 may be in the lower half of the cross section. Furthermore, the floor of the cargo may be closer to the keel and the stanchions may terminate in the hoop type frames circumferentially supporting a stringer reinforced outer skin. One having ordinary skill in the art would understand that seat tracks 100 may be used for other applications and, more specifically, in other vehicles, such as in buses, trains, and/or boats. Various aspects and features of aircraft 1102 are described below with reference to FIGS. 8 and 9. The orientation of aircraft 1102 and seat tracks 100 are identified with axes X, Y, and Z. The Y axis is parallel to the principal axis of aircraft 1102 and to the principal axes of seat tracks 100.

Figure 1B:
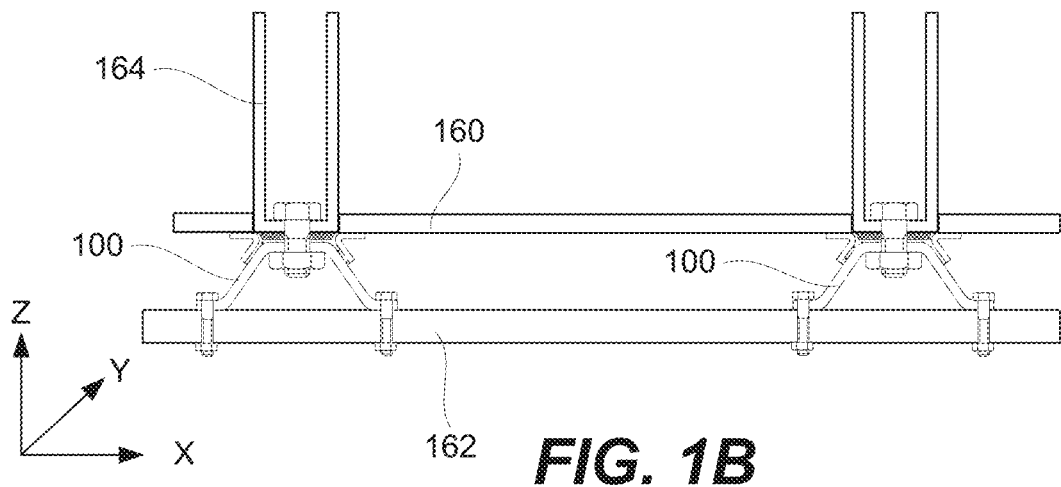
FIG. 1B is a schematic cross-sectional view a floor beam supporting two seat tracks, in accordance with some embodiments.

FIG. 1B is a schematic cross-sectional view floor beam 162 supporting two seat tracks 100, in accordance with some embodiments. As shown in FIG. 1B, seat tracks 100 may be bolted to floor beams 162. Other forms of attachment are also within the scope, such as interlocking, riveting, adhering, stitching, fastening, and bonding. As further described below with reference to FIG. 1C, seat tracks 100 may have bottom openings 107 for bolting or otherwise attaching seat tracks 100 to floor beams 162 or other support components. Bottom openings 107 may be provided in bottom supports 114 of composite frame 110 as, for example, shown in FIGS. 1C and 6B.

Also shown in FIG. 1B are seats 164 attached to seat tracks 100. For example, seats 164 may be bolted to seat tracks 100 using openings 102, which may be also referred to top openings. Other forms of attachments, such as interlocking are also within the scope. Multiple closely-spaced openings 102 may be provided within seat tracks 100 to allow adjusting position of seats 164 along the Y direction.

FIG. 1B also illustrates floor board 160 extending between two adjacent seat tracks 100 and supported by these seat tracks 100. As further described below with reference to FIG. 1C and FIGS. 5A-5D, seat track 100 may have floor supports 130 for supporting floor boards 160. Floor supports 130 may have a top surface extending parallel to the X-Y plane and contact floor boards 160. It should be noted that typical loads exerted in floor boards 160 may be substantially less than typical loads exerted on seat 164, especially during critical conditions.

Examples of Seat Tracks

Figure 1C:
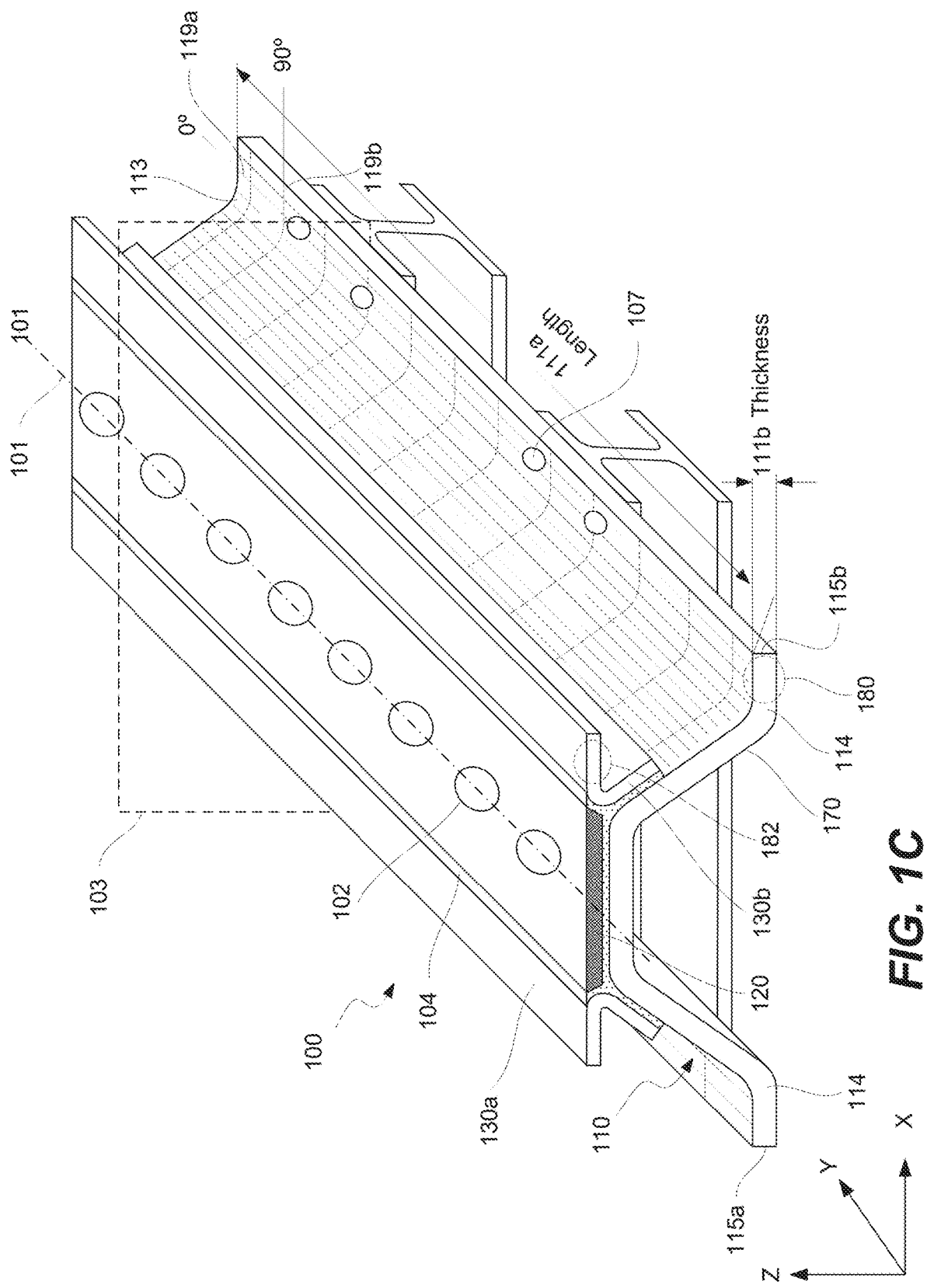
FIG. 1C is a schematic perspective view a seat track, in accordance with some embodiments.

FIG. 1C is a schematic perspective view seat track 100, in accordance with some embodiments. Seat track 100 extends along its principal axis 101, which may be parallel to the Y axis. Seat track 100 comprises composite frame 110 and, in some embodiments, reinforcement component 120 attached to composite frame 110. Seat track 100 may also comprise composite floor supports 130a and 130b attached to composite frame 110. Each of these components will now be described in more detail.

Figure 1D:
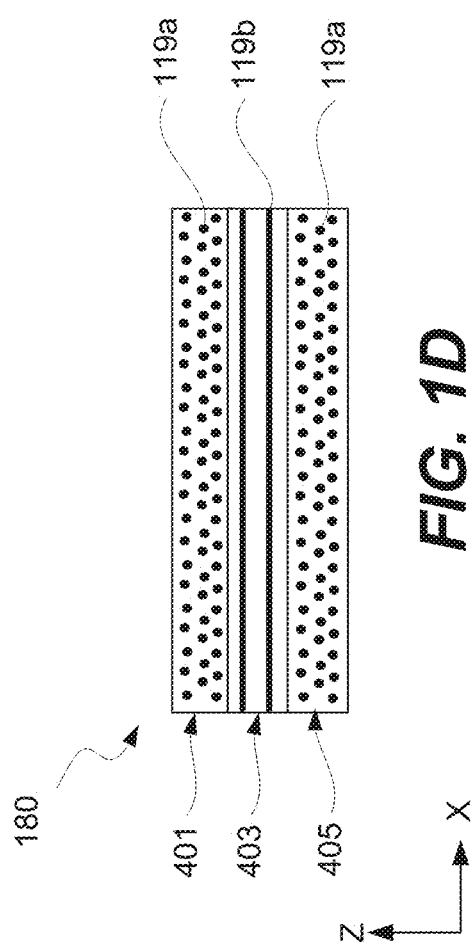
FIG. 1D is a schematic cross-sectional view of a composite frame showing different plies of a layup used to form the composite frame and fibers within the different plies, in accordance with some embodiments.

Composite frame 110 comprises first fibers 119a and second fibers 119b in resin matrix 113. First fibers 119a and second fibers 119b are schematically shown in FIG. 1C with dashed lines as some first fibers 119a and second fibers 119b may not be visible on the surface of composite frame 110. One having skill in the art would understand from this schematic drawing the relative directions of first fibers 119a and second fibers 119b. For example, composite frame 110 may be formed of multiple plies as further described below with reference to FIG. 4A and schematically shown in FIG. 1D. Specifically, FIG. 1D is a schematic cross-sectional view of composite frame portion 180 showing different plies 401-405 forming composite frame 110. Composite frame portion 180 is identified schematically in FIG. 1C by a dashed circle. FIG. 1D also shows different plies 401-405. In this example, first fibers 119a are positioned in plies 401 and 405 and are oriented in the direction perpendicular to this view. Second fibers 119b are positioned in ply 403 are oriented along the X axis. Additional examples of plies 401-405 and different fibers within these plies are described below with reference to FIG. 4A. One having ordinary skills in the art would understand that the number of plies and the orientation of these plies and, as a result, the orientation of the fibers in these plies may be different and may depend on the expected loads to be applied on composite frame 110.

The top ply may contain fibers running one direction, such as first fibers 119a identified with 0° orientation, and block fibers contained in other plies, such as second fibers 119b identified with 90° orientation. As such, it may not be possible to both first fibers 119a and second fibers 119b on the surface of composite frame 110 unless both first fibers 119a and second fibers 119b are provided in the same ply. The more representative view of first fibers 119a and second fibers 119b is presented in FIG. 4A and further described below. One having skill in the art would understand from the schematic drawing presented in FIG. 1C the relative directions of first fibers 119a and second fibers 119b in the formed composite frame 110. First fibers 119a extend parallel to a principal axis 101 of the seat track 100. Second fibers 119b extend within planes 103 perpendicular to principal axis 101 of seat track 100. The orientation of first fibers 119a and second fibers 119b are schematically shown in FIG. 1C and FIG. 3B with dotted lines. One having ordinary skill in the art would understand that first fibers 119a and second fibers 119b would be integrated into composite frame 110 and may not be visible.

The orientation, type, density, and other characteristics of first fibers 119a and second fibers 119b are specifically selected to achieve anisotropic mechanical properties of composite frame 110 designed based on load support requirement of composite frame 110. For example, the tensile strength of composite frame 110 in the direction of the principal axis 101 may be greater than the tensile strength of composite frame 110 in any direction within planes 103 perpendicular to principal axis 101. This tensile strength difference may be provided by the differences in first fibers 119a and second fibers 119b.

In some embodiments, composite frame 110 is the main load bearing component of the seat track 100.

The different load support requirements will now be described with reference to FIGS. 2A-2C. Specifically, FIG. 2A is a schematic cross-sectional view seat track 100, in accordance with some embodiments. FIGS. 2B and 2C are schematic side views of seat track 100 of FIG. 2A showing different forces 190 and 195 applied to seat track 100 during different operating conditions of seat track 100. Composite floor support 130b and bottom support flange 114 is identified in all three figures for reference purposes.

During normal operating conditions, seat track 100 may experience force 190 directed primarily along the Z axis. For example, force 190 may be in the direction opposite of the Z axis as shown in FIGS. 2B and 2C. Force 190 may be caused by the weight of the seats and passengers exerted onto seat track 100. It should be noted that even during the normal operating conditions, force 190 may have a component extending along the Y axis, such as during normal acceleration or deceleration of the aircraft. However, this Y component may be smaller than the Z component and therefore is not shown in FIGS. 2B and 2C for clarity.

During extreme operating conditions, such as rapid acceleration or deceleration, impact, and landing, seat track 100 may experience force 195 directed predominantly along the Y axis. Force 195 may also have some Z component, but this component may be substantially smaller the Y component. The Z component may be in either direction as comparatively shown in FIGS. 2B and 2C.

When considering both normal and extreme operating conditions together, seat track 100 will need to provide more mechanical support along the Y direction than along the Z direction. This difference is better matched with anisotropic structures that may have higher mechanical strength in the Y direction than in the Z direction. For comparison, isotropic structures generally need to be over-designed in the direction of the smaller load to ensure that adequate support is provided in the direction of the higher load. The mechanical strength or, more specifically, the tensile strength of composite frame 110 in the direction of the principal axis 101, which extends parallel the Y direction, may be greater than the tensile strength of composite frame 110 in any direction within planes 103, which extends parallel to the Y-Z plane, as described above.

The strength difference in seat track 100 or, more specifically, in composite frame 110 may be provided by the differences in first fibers 119*a* and second fibers 119*b*. For example, the average fiber density of first fibers 119*a* within composite frame 110 may be greater than the average fiber density of second fibers. In other words, for a unit volume of composite frame 110, the number of first fibers 119*a* with this unit volume will be greater than the number of second fibers 119*b*. The average fiber density may be also referred to as an average fiber concentration. It should be noted that the overall number of first fibers 119*a* and second fibers 119*b* may depend on the size of composite frame 110 along different directions and, the overall number of first fibers 119*a* may be actually less than the overall number of second fibers 119*b* when, for example, composite frame 110 is particularly long in the Y direction. Furthermore, it should be noted that the distribution of first fibers 119*a* and second fibers 119*b* in seat track 100 may be uneven and average values for the entire seat track 100 may be considered.

In some embodiments, the ratio of the average fiber density of first fibers 119*a* to the average fiber density of second fibers 119*b* is between about 2 and 20 or, more specifically, between 3 and 10, or even between about 4 and 8. For example, based on all fibers present in composite frame 110, first fibers 119*a* may represent at least about 40% or, more specifically, at least about 50% or even at least about 60% of all fibers in composite frame 110. Second fibers 119*b* may represent less than about 30% or, more specifically, less than about 20% or even less than about 10% of all fibers in composite frame 110.

These ratios may be selected based on expected loads in different directions. As described above with reference to FIGS. 2A-2C, the largest load component may be along the Y axis. As such, the average fiber density of first fibers 119*a* extending in the same direction may be the greatest.

In general, there are multiple ways to vary the strength of a composite structure against loads applied in different directions. The fiber density described above is one way. Another way includes using higher modulus fibers. With this approach, the fiber density may be same in different directions. Furthermore, the distribution of different fibers throughout the volume or, more specifically, the thickness may be varied by, for example, varying the order of plies used to form a composite structure.

The strength difference may be also achieved by different types of fibers used in different directions. For example, the average diameter of first fibers 119*a* may be greater than the average diameter of second fibers 119*b*. Furthermore, first fibers 119*a* may be made from a material that is different than the material of second fibers 119*b*. For example, the material of first fibers 119*a* may have a higher tensile strength than the material of second fibers 119*b*.

In some embodiments, first fibers 119*a* and second fibers 119*b* are unevenly distributed throughout thickness 111*b* of composite frame 110. Thickness 111*b* of composite frame 110 is a sheet thickness in the Z direction as, for example, shown in FIG. 1C, rather the overall height of composite frame 110 in the same direction. The uneven distribution of first fibers 119*a* and second fibers 119*b* may be controlled during manufacturing. For example, composite frame 110 may be formed from a laminate of different plies such than one or more of these plies comprise first fibers 119*a* and one or more other plies comprise second fibers 119*b* as will now be described with reference to FIG. 4A.

Figure 4A:
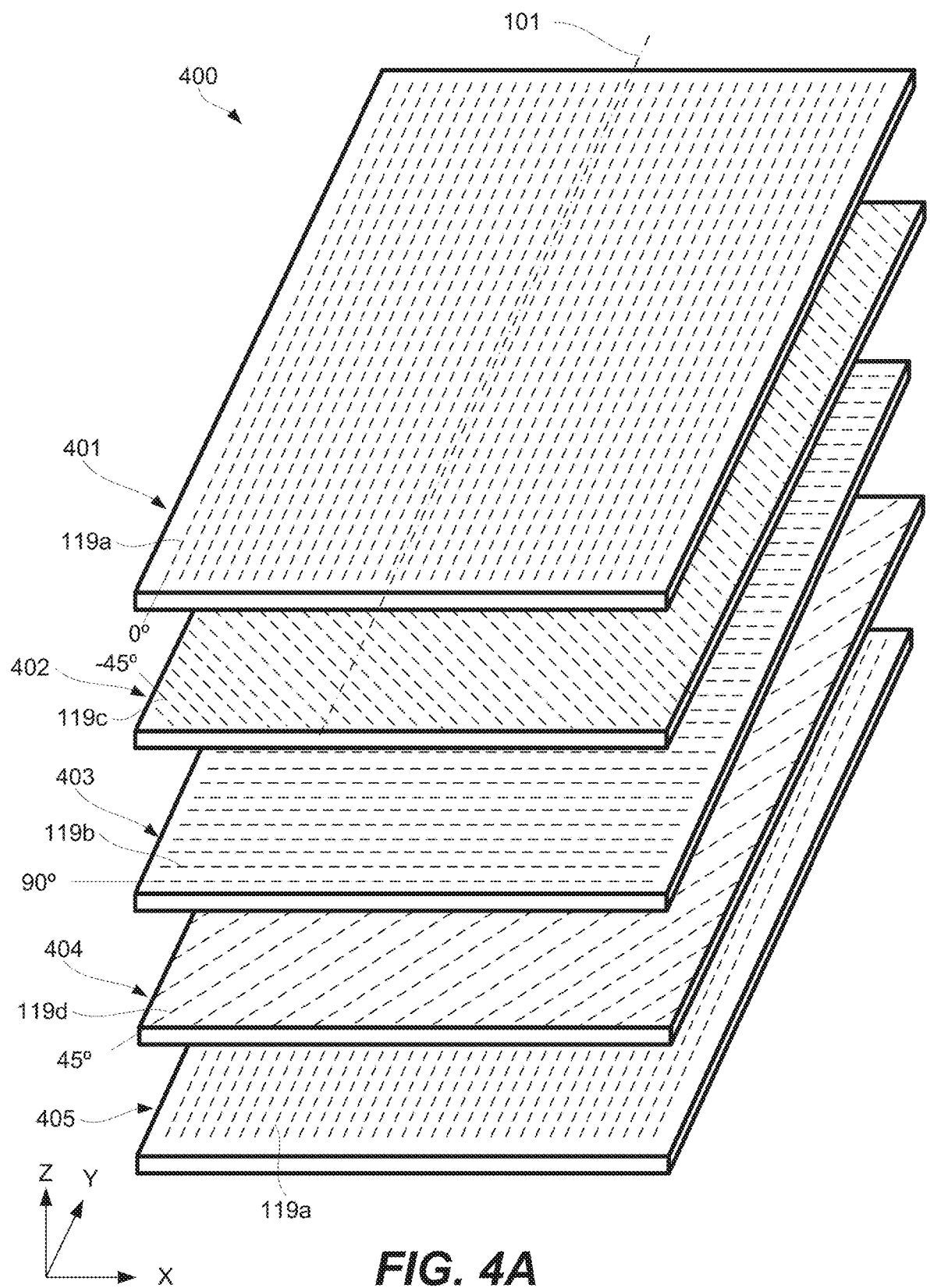
FIG. 4A is a schematic exploded view of a frame layup used to form a composite frame for use in a seat track, in accordance with some embodiments.

FIG. 4A illustrates an example of frame layup 400 that may be used to form composite frame 110, in some embodiments. Frame layup 400 includes five plies 401-405 in this example. However, one having ordinary skill in the art would understand that any number of plies can be used. FIG. 4A illustrates an example, in which each one of plies 401-405 includes fibers. However, some plies may be fiber-less in other examples.

Referring to the example shown in FIG. 4A, first ply 401 includes first fibers 119*a* extending along the Y axis. Second ply 402 include third fibers 119*b* extending at a 45° angle to the Y axis and to the X axis. Third ply 403 include second fibers 119*b* extending along the X axis. Fourth ply 404 include fourth fibers 119*d* extending at a 45° angle to the Y axis and to the X axis and at a 90° relative to third fibers 119*b*. Finally, fifth ply 405 includes first fibers 119*a* extending along the Y axis. It should be noted that fibers with different orientations may be provided as a part of the same ply. For example, third fibers 119*c* and fourth fibers 119*d* may be parts of the same ply or, more specifically, of a woven fabric used as a ply in a frame layup. The orientation of all fibers in the formed composite frame 110 is shown in FIG. 3B.

When composite frame 110 is formed from frame layup 400, first fibers 119*a* may be positioned close to surfaces of composite frame 110, while second fibers 119*b* may be positioned closer to a center of composite frame 110.

In some embodiments, the majority of first fibers 119*a* are substantially straight as for example, schematically shown in FIG. 1C. Specifically, first fibers 119*a* may be straight despite composite frame 110 having non-planar shape 170. First fibers 119*a* extend in the direction that does not have bends. That features ensures the most load support from first fibers 119*a*.

Furthermore, the majority of first fibers 119*a* may extend substantially entire length 111*a* of composite frame 110 as for example, schematically shown in FIG. 1C and FIG. 3B. As such, this portion of first fibers 119*a* may be referred to as continuous fibers. It should be noted that continuous fibers generally provide better load support than discontinuous examples, such as chopped fibers, filler particles.

Some of first fibers 119*a* may be interrupted by various openings in composite frame 110 as for example, schematically shown in FIG. 1C and FIG. 3B. For example, first fibers 119a positioned next to principal axis 101 may be interrupted by openings 102, which are used to attach seats. First fibers 119a positioned next to first flange end 115a and second flange end 115b may be interrupted by bottom openings 107, which may be used for used, for example, to attach composite frame 110 to floor beams 162. The discontinuity in fibers may be mitigated by reinforcement components. For example, FIG. 5B illustrates reinforcement component 120 positioned around opening 102. FIG. 5B also illustrates reinforcement components 125a and 125b positioned around bottom openings 107a and 107b, respectively.

Second fibers 119b may be curved within planes 103 perpendicular to principal axis 101. Portion 119b' of second fibers 119b may extend continuously between first flange end 115a and second flange end 115b of composite frame 110 as, for example, shown in FIG. 3B. This portion 119b' may not be interrupted by any openings in composite frame 110. Another portion 119b'' may be interrupted by openings 102, bottom openings 107, or both as, for example, shown in FIG. 3B.

In some embodiments, composite frame 110 further comprises third fibers 119c disposed at an angle of between about 30° to 60° relative to first fibers 119a and relative to second fibers 119b as, for example, shown in FIG. 3B. The average fiber density of third fibers 119c within composite frame 110 is less than the average fiber density of first fibers 119a. For example, the ratio of the average fiber density of first fibers 119a to the average fiber density of third fibers 119c may be between about 2 and 20 or, more specifically, between about 3 and 10. Furthermore, the average fiber density of third fibers 119c within composite frame 110 may be greater than the average fiber density of second fibers 119b within composite frame 110. For example, the average fiber density of third fibers 119c to the average fiber density of second fibers 119b may be between about 2 and 20 or, more specifically, between about 3 and 10.

In some embodiments, composite frame 110 further comprises fourth fibers 119d disposed at an angle of between about 30° to 60° relative to first fibers 119a and relative to second fibers 119b and, in some cases, perpendicular to third fibers 119c. For example, fourth fibers 119d and third fibers 119c may be parts of the same ply used to form composite frame 110 or, more specifically, may be parts of the same woven fabric. The average fiber density of fourth fibers 119d within composite frame 110 may be less than the average fiber density of first fibers 119a. For example, the ratio of the average fiber density of first fibers 119a to the average fiber density of fourth fibers 119d may be between about 2 and 20 or, more specifically, between about 3 and 10. Furthermore, the average fiber density of fourth fibers 119d within composite frame 110 may be greater than the average fiber density of second fibers 119b. For example, the average fiber density of fourth fibers 119d to the average fiber density of second fibers 119b may be between about 2 and 20 or, more specifically, between about 3 and 10. Finally, the average fiber density of third fibers 119c may be substantially the same as the average fiber density of the third fibers 119c. For example, the average fiber density of fourth fibers 119d to the average fiber density of third fibers 119c may be between about 0.1 and 10 or, more specifically, between about 0.5 and 2. As described above, the average fiber density for each type of fibers may be selected based on expected loads in this direction. Third fibers 119c and fourth fibers 119d may be also used to establish cross-link within composite frame and prevent delamination and other negative effects.

Figure 3A:
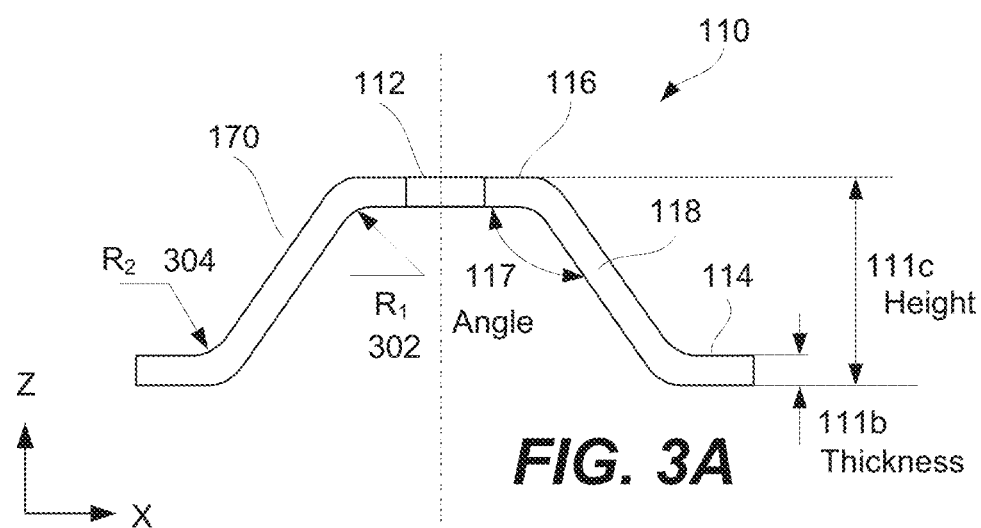
FIG. 3A is a schematic cross-sectional view a composite frame used in a seat track, in accordance with some embodiments.
Figure 3B:
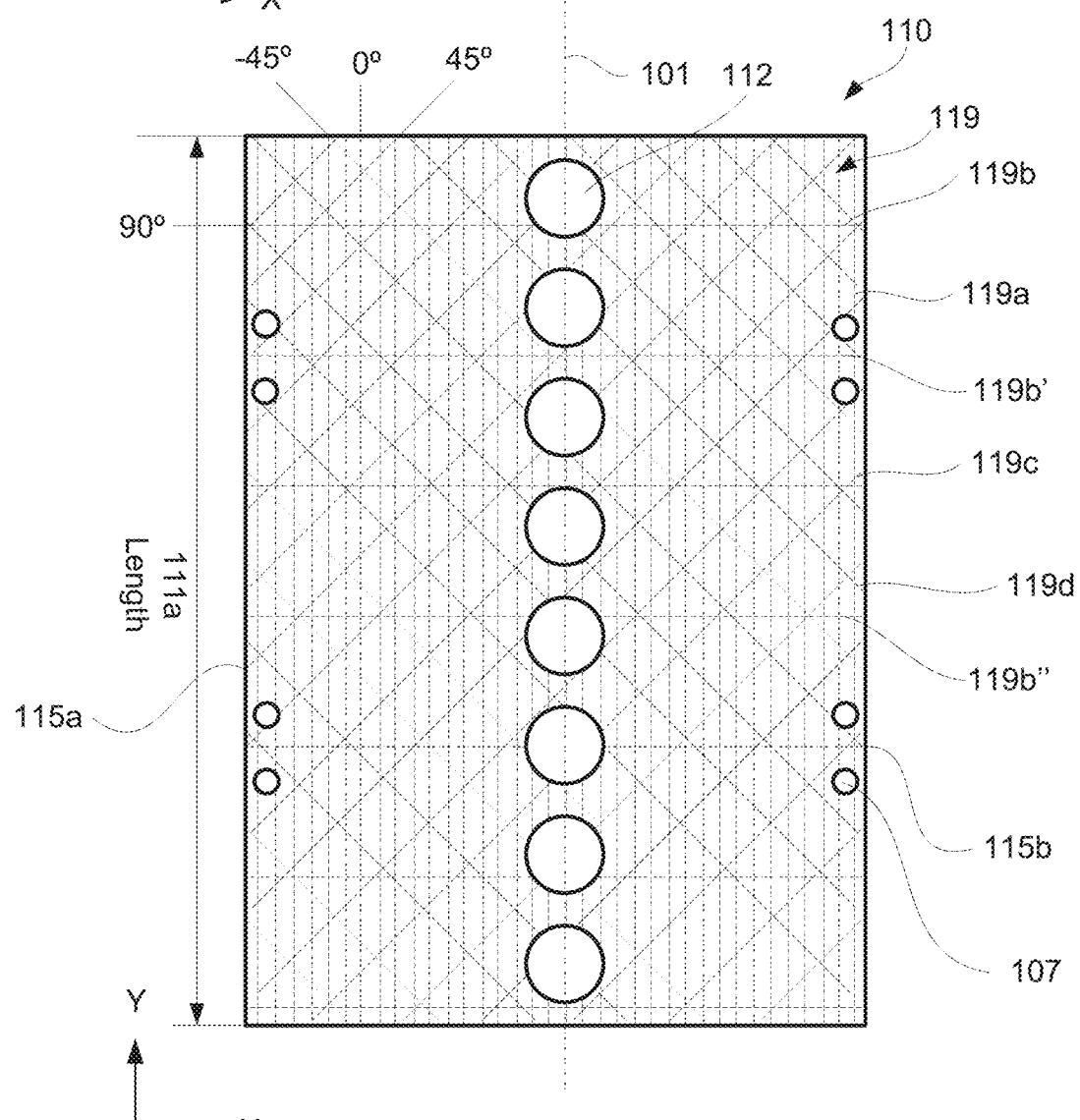
FIG. 3B is a schematic top view of the composite frame of FIG. 3A, in accordance with some embodiments.

In some embodiments, composite frame 110 comprises bottom support flange 114, top portion 116, and leg portion 118 extending between the bottom support flange 114 and the top portion 116 as, for example, shown in FIG. 3A. Bottom support flange 114 may be substantially parallel to top portion 116. Angle 117 between top portion 116 and leg portion 118 is between 100° and 120° such as about 110°. This angle determines the orientation of different loads relative to first fibers 119a and second fibers 119b as composite frame 110 transfers these loads from seat 164 to aircraft support beam 162.

The fiber orientation, number of plies with the desired orientation, and the angle of the seat track web creates the load paths through composite frame 110 and provides a means for reacting the loads within composite frame 110. In some embodiments, bottom support flange 114, top portion 116, and leg portion 118 are monolithic such that a portion of second fibers 119b extend continuously between bottom support flange 114, top portion 116, and leg portion 118 as, for example, is schematically shown in FIGS. 3A and 3B. At the same time, a portion of first fibers 119a extending within bottom support flange 114 may not extend within top portion 116 or leg portion 118. Likewise, a portion of first fibers 119a extending within top portion 116 may not extend within bottom support flange 114 or leg portion 118.

In some embodiments, seat track 100 comprises openings 102 extending through both composite frame 110 and reinforcement component 120. Specifically, composite frame 110 has frame openings 112, while reinforcement component 120 has reinforcement component openings 122, which may be aligned with frame openings 112 and collectively form openings 102 of seat track 100 as, for example, shown in FIG. 5A. Openings 102 may interrupt a portion of first fibers 119a and a portion of second fibers 119b of composite frame 110 as, schematically shown in FIG. 3B. Openings 102 may be arranged in a row along principal axis 101 of seat track 100.

Figure 1E:
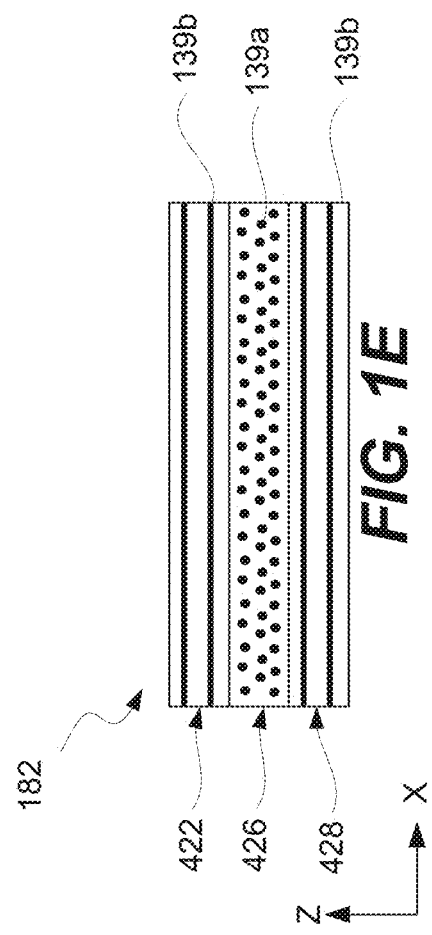
FIG. 1E is a schematic cross-sectional view of a composite floor support showing different plies of a layup used to form the composite floor support and fibers within the different plies, in accordance with some embodiments.
Figure 4B:
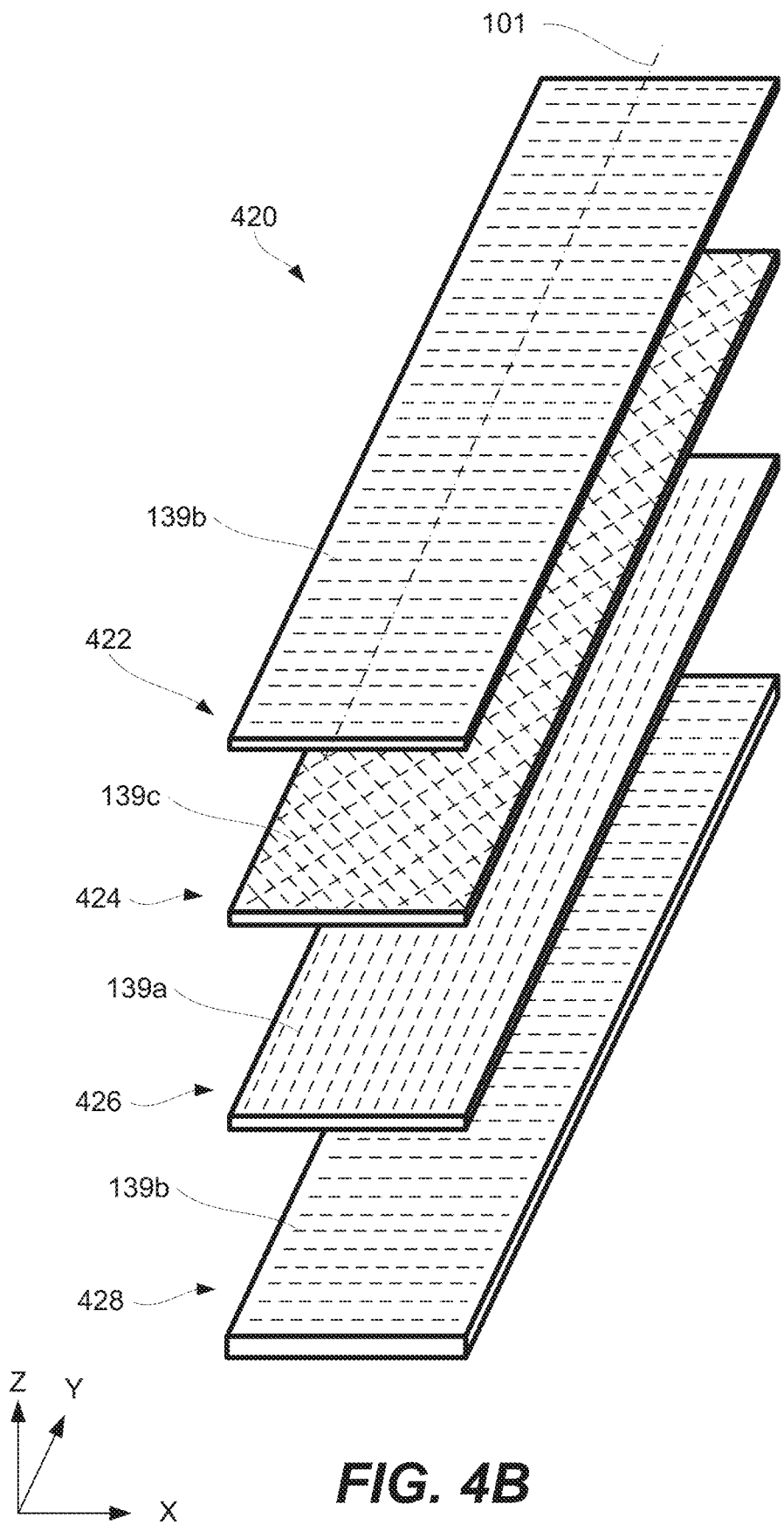
FIG. 4B is a schematic exploded view of a floor support layup used to form a composite floor support for use in a seat track, in accordance with some embodiments.

In some embodiments, seat track 100 comprises composite floor supports 130 attached to composite frame 110. When reinforcement component 120 is used, composite floor supports 130 may be positioned on opposite sides of reinforcement component 120 as, for example, shown in FIG. 1C. Composite floor supports 130 may comprise first fibers 139a extending parallel to principal axis 101 as, for example, schematically shown in FIGS. 3C and 3D. It should be noted that while FIGS. 1C, 3C, and 5A-5D show composite floor supports 130 as a monolithic structure, composite floor supports 130 has multiple components, e.g., fibers 139a and 139b and other components. Furthermore, composite floor supports 130 may be formed by laminating of a layup as schematically shown in FIGS. 1E and 4B and described below with reference to these two figures.

Composite floor supports 130 may also comprise second fibers 139b extending within planes 103 substantially perpendicular to principal axis 101. First fibers 139a and second fibers 139b of composite floor supports 130 should not be confused with first fibers 119a and second fibers 119b of composite frame 110. Composite floor supports 130 and composite frame 110 have different functions and experience different loads. As a result, composite floor supports 130 and composite frame 110 may have different fiber orientation or, more generally, fiber characteristics. FIG. 1E is a schematic cross-sectional view of composite floor support portion 182 showing different plies 422-428 and fibers 139a-139b within these plies, in accordance with some embodiments. Floor support portion 182 is schematically identified in FIG. D using a dashed-line circle. One having ordinary skills in the art would understand that the number of plies and the orientation of these plies and, as a result, the orientation of the fibers in these plies may be different and may depend on the expected loads to be applied on composite floor supports 130. Furthermore, it should be noted that the orientation of the fibers in composite floor supports 130 may be different than that in composite frame 110.

In some embodiments, the tensile strength of composite floor supports 130 in the direction parallel to principal axis 101 is less than the tensile strength of composite floor supports 130 in the direction within planes 103 substantially perpendicular to principal axis 101. The average fiber density of first fibers 139a of composite floor supports 130 may be less than the average fiber density of second fibers 139b of composite floor supports 130. For example, the ratio of the average fiber density of second fibers 139b to the average fiber density of first fibers 139a may be between about 2 and 20 or, more specifically, between about 3 and 10. Examples of fiber orientations in composite floor supports 130 are presented in FIG. 3D and FIG. 4B. Specifically, FIG. 4B is an example of layup 420 that may be used for fabricating composite floor supports 130. Layup 420 is shown to include first ply 422 containing fibers 139b, second ply 424 containing fibers 139c, third ply 426 containing fibers 139a, and fourth ply 428 also containing fibers 139b. Principal axis 101 is shown for reference to reflect orientations of fibers 139a-139b in layup 420 relative to each other and other components of seat track 100. For example, fibers 139a may have 0° orientation, while fibers 139b may have 90° orientation. Fibers 139c may be a part of a mesh with +/−45° orientation. These orientations are also described above with reference to FIG. 3D.

Figure 5A:
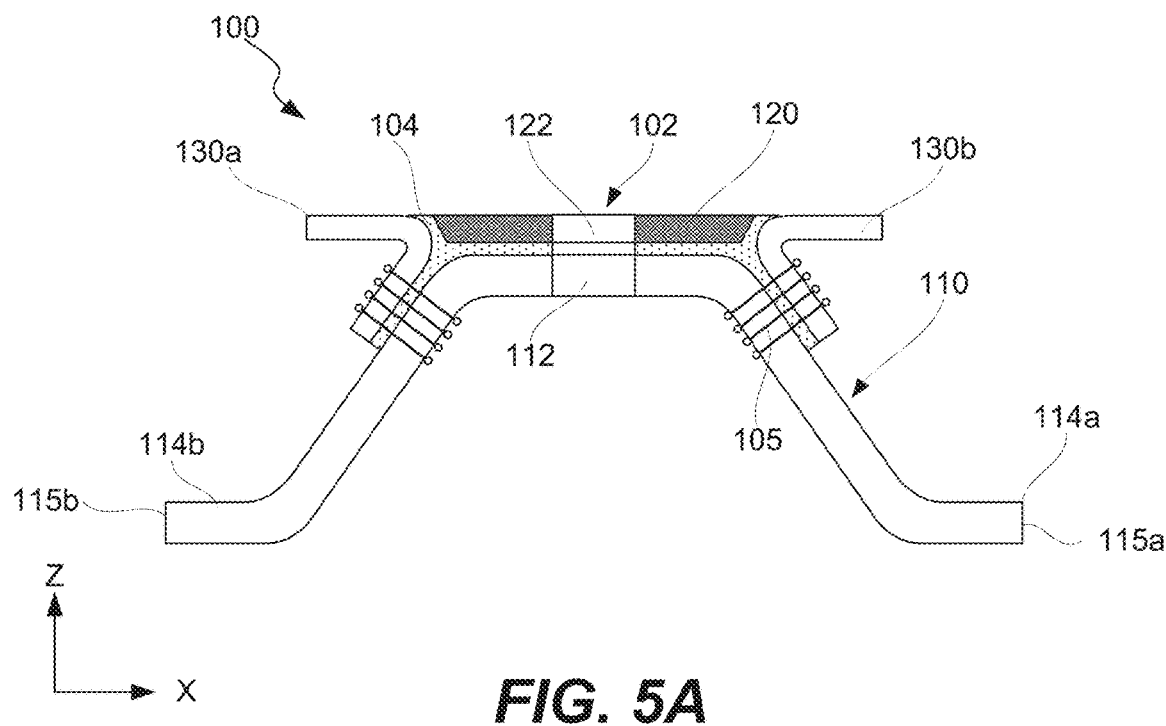
FIGS. 5A-5D are schematic cross-sectional views of different examples of a seat track, in accordance with some embodiments.
Figure 5B:
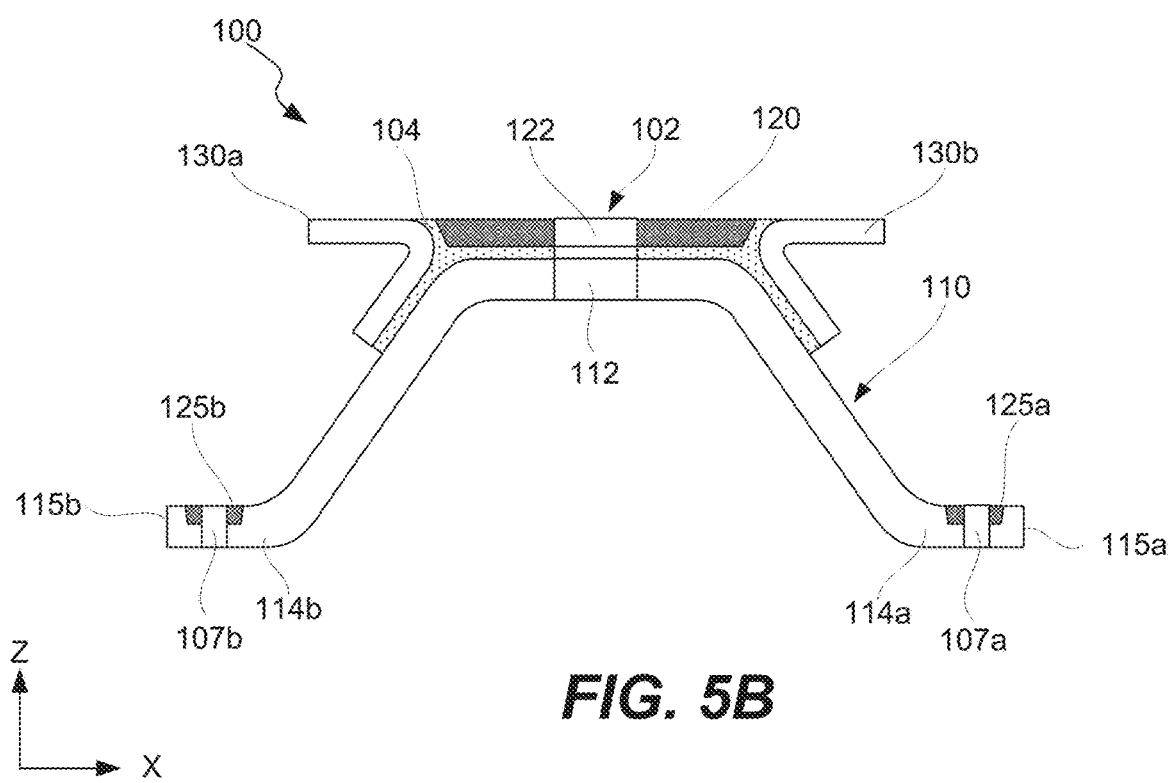

In some embodiments, the top surfaces of composite floor supports 130 are coplanar with the top surface of reinforcement component 120 as, for example, shown in FIGS. 5A and 5B. Reinforcement component 120 may also overlap with floor boards and provide support. In some embodiments, reinforcement component 120 replaces separate composite floor supports 130 as, for example, shown in FIG. 5C. In these embodiments, portions of reinforcement component 120 may function as composite floor supports 130a and 130b.

In some embodiments, composite floor supports 130 are attached to composite frame 110 using adhesive 104. Other methods of attachment may be used in addition or instead of adhesive. For example, composite floor supports 130 may be further attached to composite frame 110 using stitching 105 as, for example, schematically shown in FIG. 5A.

In some embodiments, reinforcement component 120 is attached to composite frame 110 using adhesive 104. Reinforcement component 120 may be a non-composite component. For example, reinforcement component 120 may comprise metal, such as aluminum or titanium.

In some embodiments, composite frame 110 is not supported directly by the floor beams. Instead, seat track 100 may have composite legs 140a and 140b attached to composite frame 110 as, for example, shown in FIG. 5D. In these embodiments, composite legs 140a and 140b, but not composite frame 110, are attached to composite frame 110. Furthermore, composite floor supports 130b may be attached to composite legs 140b. Composite frame 110 may be operable as a bridge between pairs of composite floor supports 130b and composite legs 140b.

Examples of Forming Seat Tracks

Figure 5C:
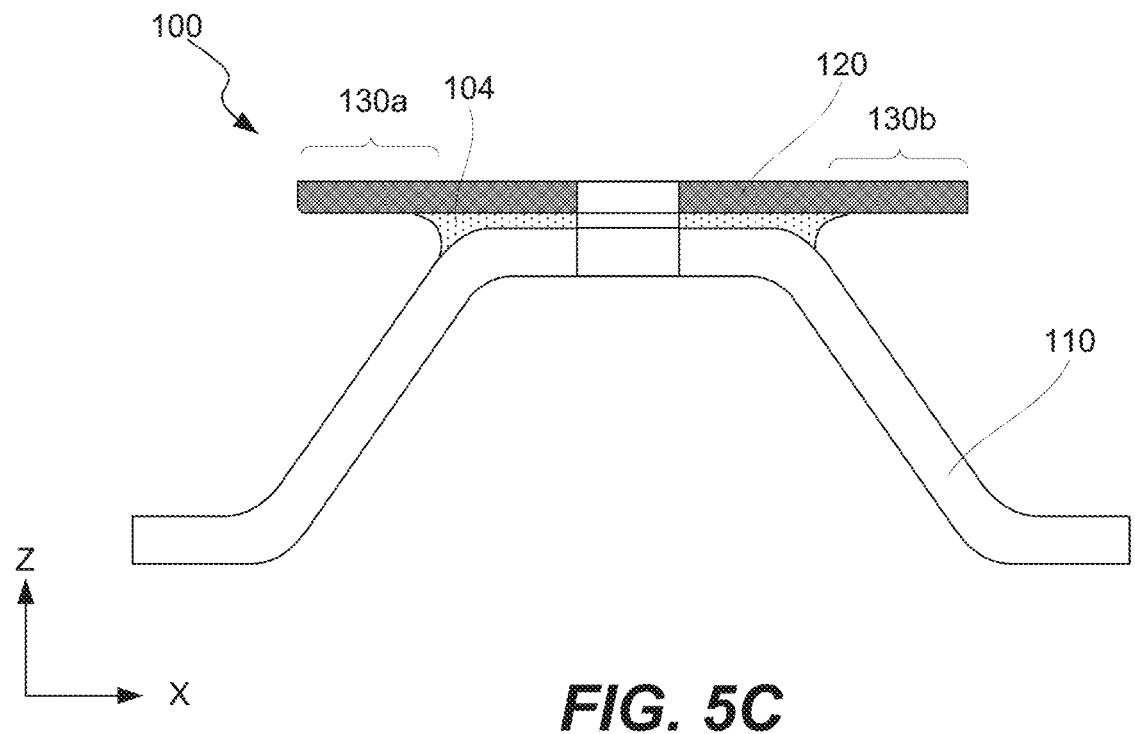
Figure 5D:
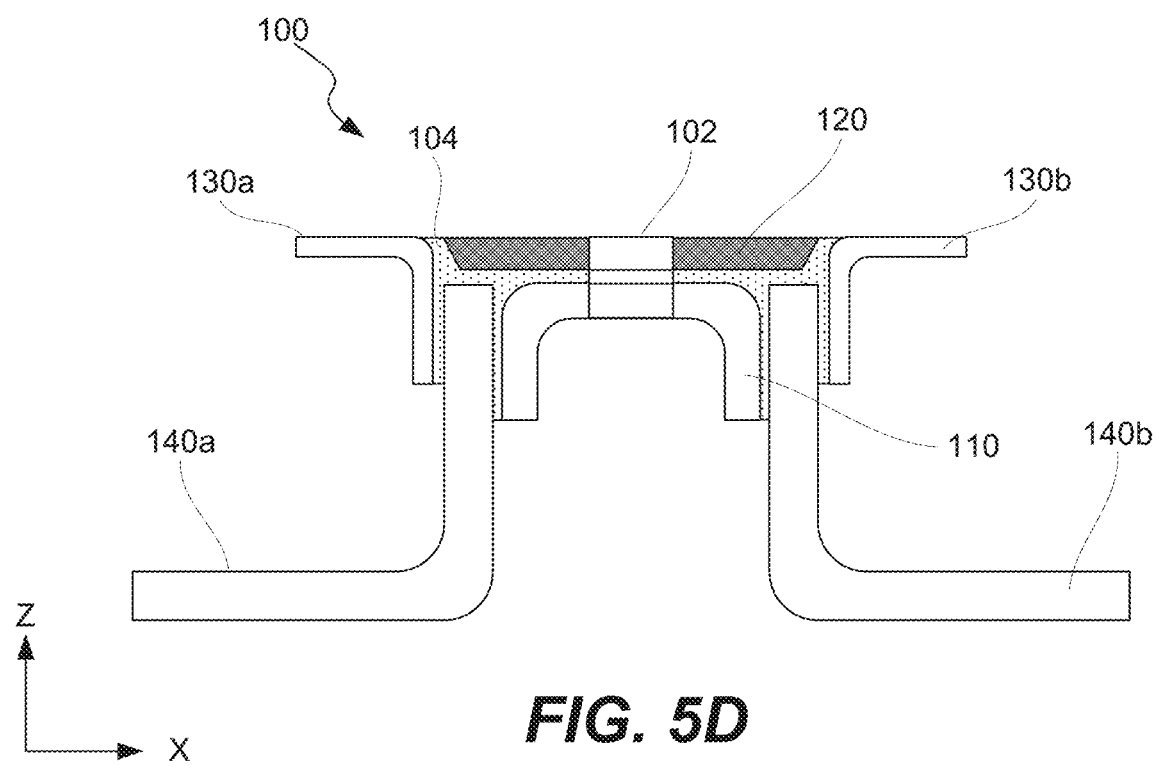
Figure 6A:
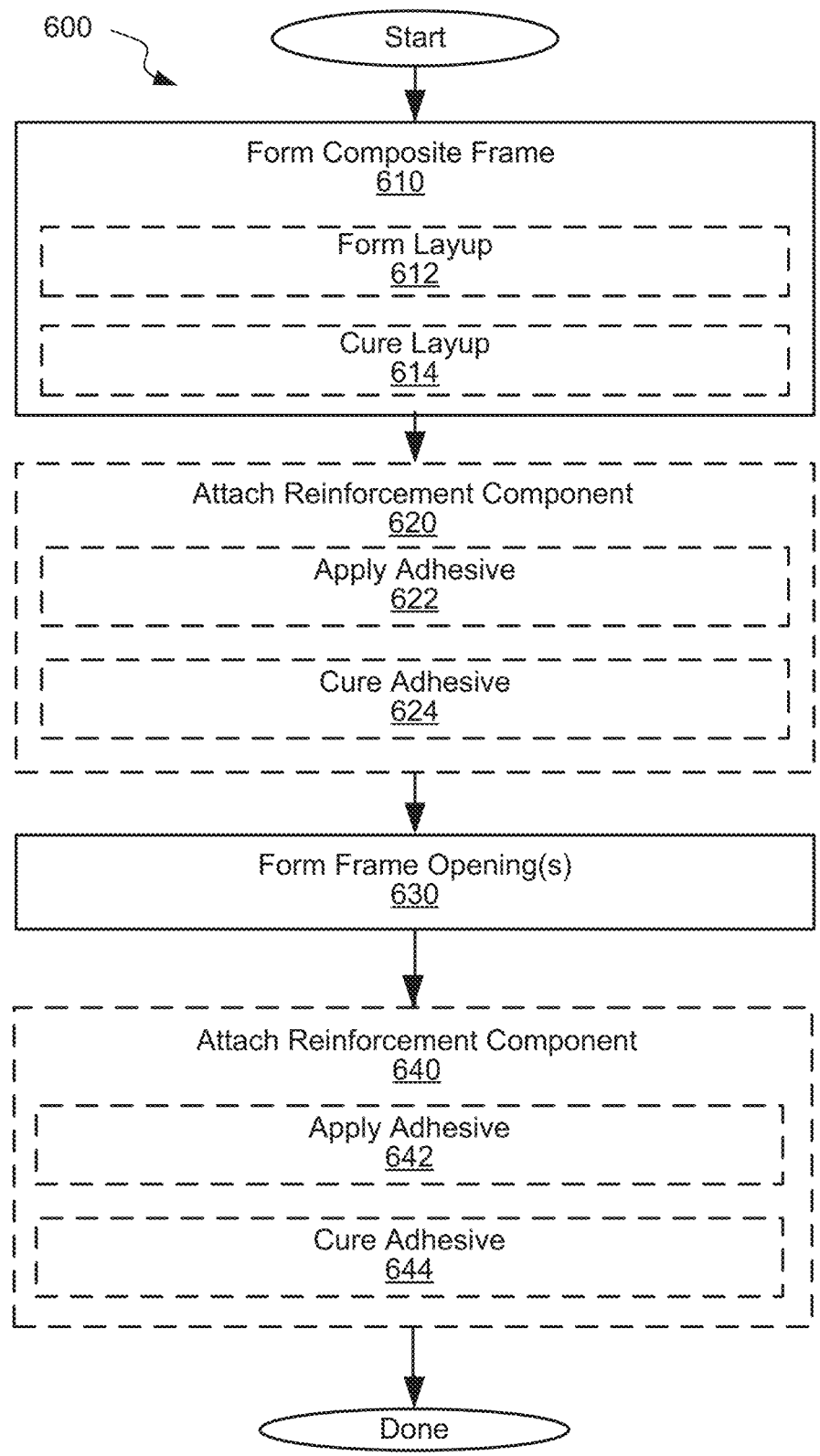
FIG. 6A is a process flowchart corresponding to a method of forming a seat track, in accordance with some embodiments.

FIG. 6A is a process flowchart corresponding to method 600 of forming seat track 100, in accordance with some embodiments. Method 600 may involve forming composite frame 110 during operation 610. Various examples of composite frame 110 are described above with reference to FIGS. 1C, 3A, 3B, 4A, and 5A-5D. It should be noted that while FIGS. 1C, 3A, 3B, 4A, and 5A-5D show composite frame 110 as a monolithic structure, composite frame 110 is a multiple layer laminate, with fibers 119a and 119b and resin matrix 113. Furthermore, composite frame 110 may be formed of a laminated layup as schematically shown in FIGS. 1D and 4A and described with reference to these two figures.

In some embodiments, composite frame 110 has non-planar shape 170 as, for example, shown in FIG. 3A. As such, height 111c of composite frame 110 in the Z direction is greater than sheet thickness 111b in the same direction. As described above, composite frame 110 may comprise first fibers 119a and second fibers 119b in resin matrix 113. First fibers 119a may extend parallel to principal axis 101 of seat track 100. Second fibers 119b may extend within planes 103 perpendicular to principal axis 101 of seat track 100. The tensile strength of composite frame 110 in the direction of principal axis 101 may be greater than the tensile strength of composite frame 110 in any direction within planes 103 perpendicular to principal axis 101.

Figure 7:
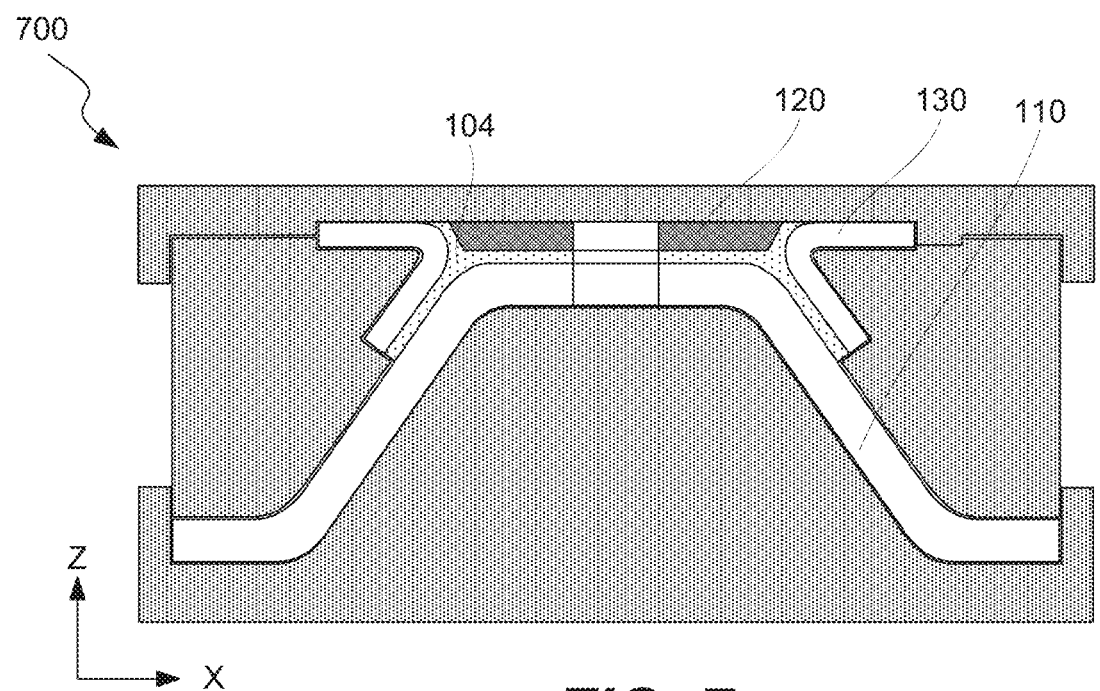
FIG. 7 is a schematic cross-sectional view of a seat track positioned in a mold while forming the seat track, in accordance with some embodiments.

Forming composite frame 110 during operation 610 may comprise forming frame layup 400 during optional operation 612. Frame layup 400 may use multiple plies 401-405 as, for example, schematically shown in FIG. 4A and described above with reference to this figure. One of multiple plies 401-405 may comprise first fibers 119a, while another one of these plies 401-405 may comprise second fibers 119b. The orientation of fibers in plies 401-405 and arrangement of plies 401-405 in layup may be used to control distribution of fibers in resulting composite frame 110. Frame layup 400 may be then cured during optional operation 614. FIG. 7 illustrates mold 700, which may be used for curing the frame layup to form composite frame 110. This operation may also involve curing composite floor supports 130 and adhering reinforcement component 120 to composite frame.

Method 600 may also comprise attaching reinforcement component 120 to composite frame 110 during optional operation 620. This operation may comprise applying adhesive 104 between reinforcement component 120 and composite frame 110 during optional operation 622. Furthermore, operation 620 may also involve curing adhesive 104 between reinforcement component 120 and composite frame 110 during optional operation 624. In some embodiments, adhesive 104 may be cured at the same time as curing composite frame 110 during operation 614. This process may be referred to as co-curing. In other words, operation 624 may be a part of operation 614 described above.

Method 600 may comprise forming frame openings 112 through composite frame 110 during operation 630. The plurality of frame openings 112 in composite frame 110 may be formed after attaching reinforcement component 120 to composite frame 110 during optional operation 620. For example, reinforcement component openings 122 may be used as anvils while forming the plurality of frame openings 112. Alternatively, reinforcement component openings 122 and frame openings 112 may be formed in a same operation. For example, frame openings 112 opening may be formed prior to attaching reinforcement component 120 to composite frame 110 as shown in FIG. 6A by the order of operations 630 and 640.

Figure 6B:
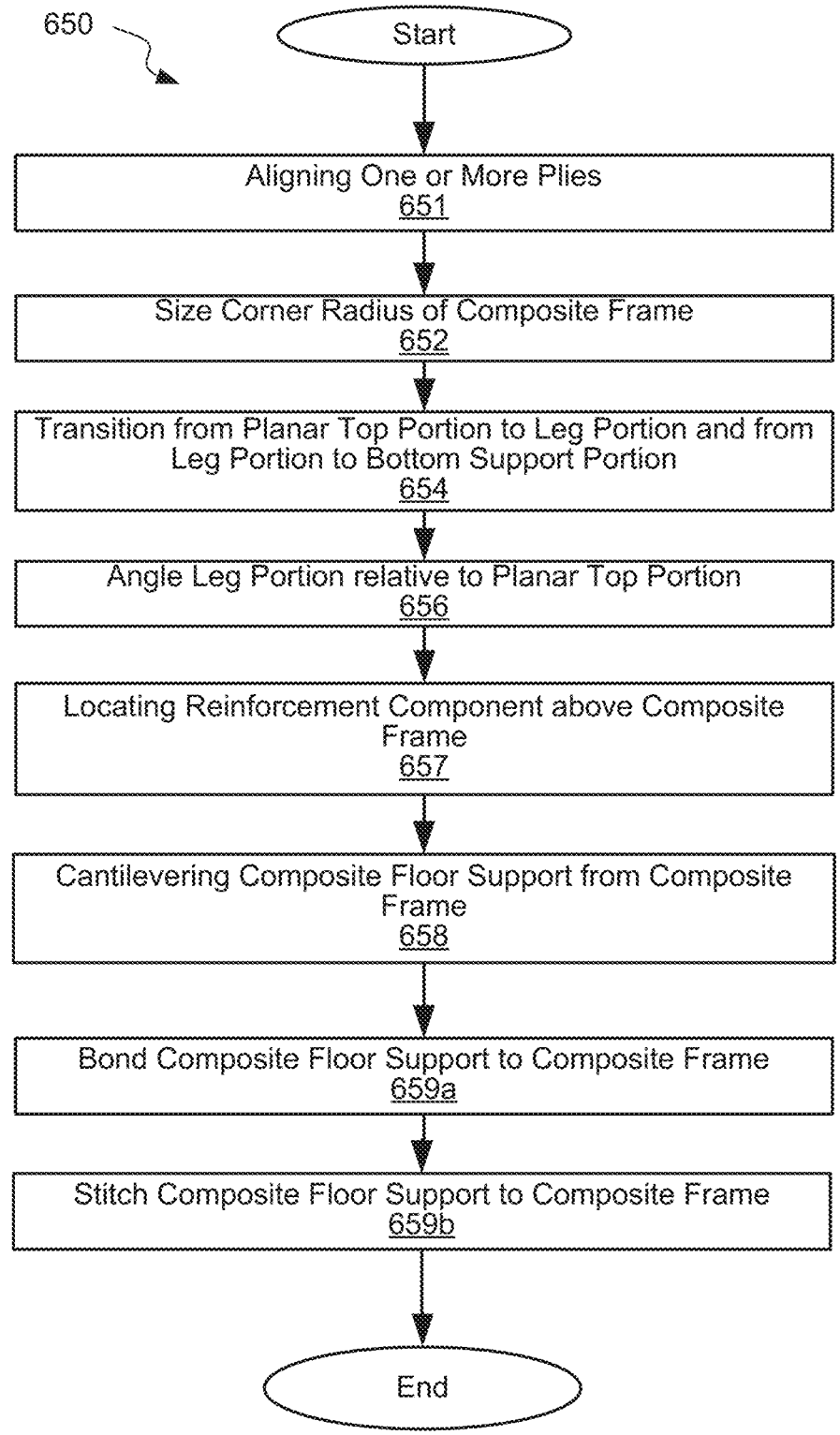
FIG. 6B is a process flowchart corresponding to another method of forming a seat track, in accordance with some embodiments.

FIG. 6B is a process flowchart corresponding to another method 650 of forming seat track 100, in accordance with some embodiments. Method 650 may comprise aligning one or more plies comprising first fibers 119a during operation 651. After this operation, first fibers 119a may have 0° orientation relative to principal axis 101 of seat track 100. Specifically, the one or more plies may be aligned to ensure this 0° orientation of first fibers 119a in composite frame 110. This orientation may be preserved during later operations of method 650 and subsequently during operation of seat track 100. As described above with reference to FIG. 4A, first fibers 119a may be provided in multiple plies, such as first ply 401 and fifth ply 405. This plies may be aligned with respect to each other and, for example, with respect to other plies.

In some embodiments, operation 651 may also comprise aligning one or more plies comprising second fibers 119b. As described above, second fibers 119b may have 90° orientation relative to principal axis 101 of seat track 100. The one or more plies comprising second fibers 119b may be different from the one or more plies comprising first fibers 119a as, for examples, shown in FIGS. 1D and 4A showing different examples of ply arrangements. In these cases, the orientation of first fibers 119a may be performed independently from the orientation of second fibers 119b. Alternatively, first fibers 119a and second fibers 119b may be performed at the same time.

In some embodiments, method 650 may comprise sizing corner radius 302 of composite frame 110 during operation 652. Corner radius 302 may be sized, for example, to decrease areas of stress concentration in composite frame 110. The corner radius 302 of the composite frame 110 may be at least about 0.25 inches, such as about 0.5 inches. While larger radii are desirable for composite structures to prevent buckling, delamination, fiber discontinuity and other negative effects, the corner radius 302 of the composite frame 110 may be kept at about 0.5 inches or less to ensure compactness and, as a result, light weight of the composite frame 110.

In some embodiments, method 650 further comprises transitioning from planar top portion 116 of composite frame 110 to leg portion 118 of composite frame 110 during operation 654. This transition may correspond to first radius 302 as, for example, shown in FIG. 3A. In some embodiments, operation 654 may also comprise transitioning from leg portion 118 of composite frame 110 to bottom support portion 114 of composite frame 110 with second radius 304 as, for example, shown in FIG. 3A. First radius 302 may be at least about 0.25 inches, such as about 0.5 inches. Second radius 303 may be at least about 0.25 inches, such as about 0.5 inches. As noted above, while larger radii are desirable for composite structures to prevent buckling, delamination, fiber discontinuity and other negative effects, first radius 302 and/or the second radius of composite frame 110 may be kept at about 0.5 inches or less to ensure compactness and, as a result, light weight of composite frame 110.

In some embodiments, method 650 may further comprise angling leg portion 118 of composite frame 110 relative to top planar portion 116 of composite frame 110 during operation 656. This operation may be performed to place more fibers of second fibers 119b long the load or, more specifically, along the direction of the expected load, especially, the maximum expected load. For example, seat track 100 may be designed to support the most load in the axial direction, followed by the load in the vertical direction, and some side load as, for example, described above with reference to FIGS. 2A-2D. A combination of the vertical load and the side load may be used for determining angle 117 between leg portion 118 and top planar portion 116 as, for example, shown in FIG. 3A. Angle 117 may be between about 100° and 120°, such as about 110°.

In some embodiments, method 650 further comprises locating reinforcement component 120 above composite frame 110 during operation 657. Furthermore, this operation may involve locating reinforcement component 120 between two composite floor supports 130. Floor supports 130 may be used to carry the load from the floor, which may be different from the load onto seat 164. Various examples of orientations of reinforcement component 120 and composite frame 110 are described above with reference to FIGS. 5A-5D.

In some embodiments, method 650 further comprises cantilevering composite floor support 130 from composite frame 110 during operation 658. Floor support 130 may be attached to composite frame 110 by one or more techniques described in this disclosure. Furthermore, a portion of composite frame 110 may be operable as floor support 130. In other words, composite frame 110 and floor support 130 may be a monolithic structure without a defined interface. For example, composite frame 110 and floor support 130 may be formed from the same layup of composite plies. Furthermore, as shown in FIG. 5C, composite floor support 130 may be formed by reinforcement component 120.

In some embodiments, method 650 further comprises bonding composite floor support 130 to composite frame 110 during operation 659a. This bonding operation 659a may comprise applying an adhesive between composite floor support 130 and composite frame 100 as well as curing the adhesive. In some embodiments, method 650 further comprises stitching composite floor support 130 to composite frame 110 during operation 659b. This stitching operation 659b may be performed in addition or instead of bonding operation 659a.

Examples of Methods of Supporting Different Loads Using Seat Tracks

Figure 6C:
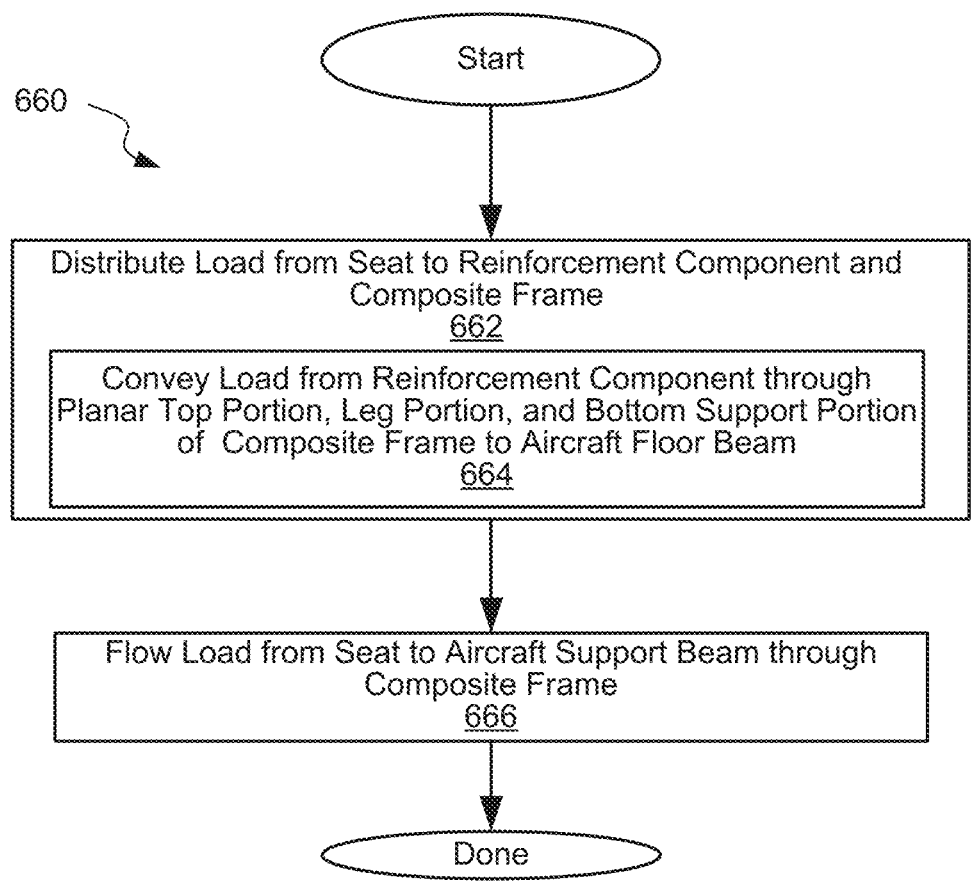
FIG. 6C is a process flowchart corresponding to a method of supporting different loads using a seat track, in accordance with some embodiments.

FIG. 6C is a process flowchart corresponding to method 660 of supporting different loads using seat track 100, in accordance with some embodiments. Method 600 may comprise distributing a load from seat 164 to reinforcement component 120 and composite frame 110 of seat track 100. Reinforcement component 120 and composite frame 110 may be coupled together during this load distribution operation 662. The load may be generated during various operations of seat 164, which may involve standard operation e.g., supporting the weight of the passengers and non-standard operations e.g., emergency landing as described above with reference to FIGS. 2A-2E. The load may be different during different operations. Furthermore, various examples of seat track 100 are described above. For example, reinforcement component 120 may comprise a metal. Composite frame 110 may comprise first fibers 119a and second fibers 119b having different direction than first fibers 119a.

In some embodiments, distributing the load during operation 662 involves conveying the load from reinforcement component 120 through planar top portion 116 of composite frame 110, leg portion 118 of composite frame 110, and bottom support portion 114 of composite frame 110 during sub-operation 664 as, for example, shown in FIG. 3A. The load is conveyed to aircraft support beam 162 connected to bottom support portion 114 as, for example, shown in FIG. 1B. This operation may be a part of distributing the load from the seat 164 to the reinforcement component 120 and the composite frame 110 of the seat track 100.

In some embodiments, method 660 further comprises flowing the load from seat 164 to aircraft support beam 162 through composite frame 110 during operation 666.

Examples of Methods of Installing Seat Tracks

Figure 6D:
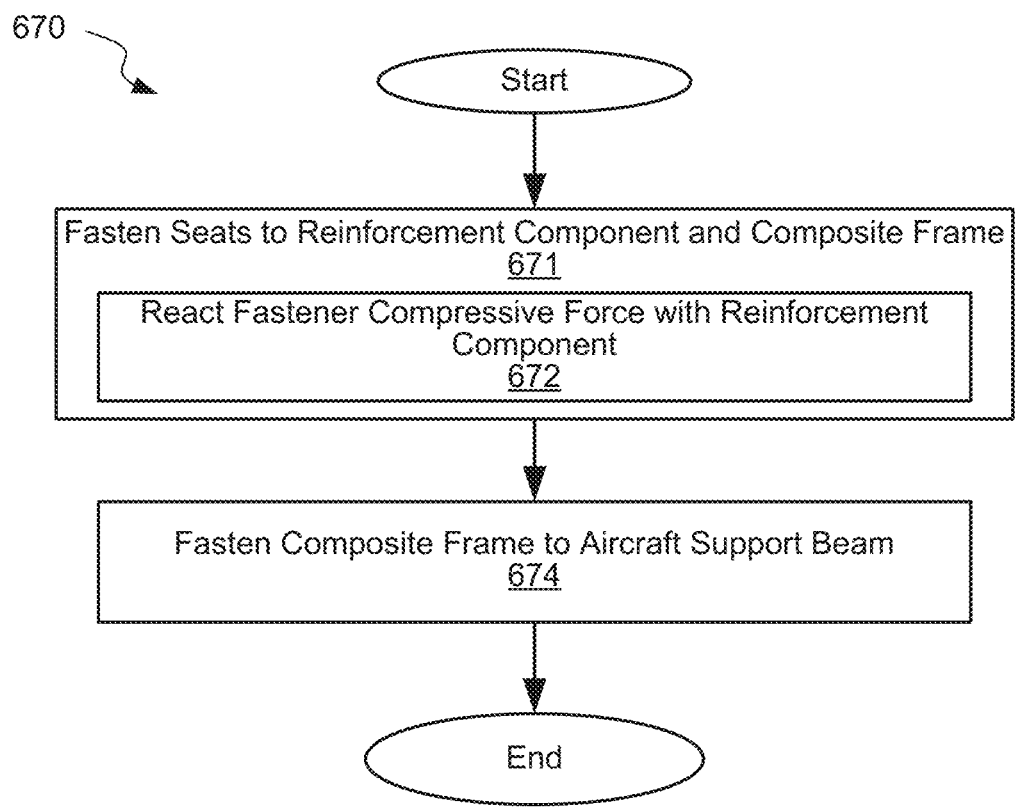
FIG. 6D is a process flowchart corresponding to a method of installing a seat track, in accordance with some embodiments.

FIG. 6D is a process flowchart corresponding to method 670 of installing seat track 100 to aircraft support beam 162, in accordance with some embodiments. Method 670 comprises fastening seat 164 to reinforcement component 120 and composite frame 110 during operation 671. Reinforcement component 120 comprises a metal. Composite frame 110 comprises first fibers 119a and second fibers 119b having different direction than first fibers 119a. Operation 671 may comprise reacting a fastener compressive force with reinforcement component 120 as, e.g., shown by block 672 in FIG. 6D.

Method 670 may also comprise fastening composite frame 110 to aircraft support beam 162 during operation 674. Reinforcement component 120 is coupled to composite frame 110 as described above. One example, of composite frame 110 fastened to aircraft support beam 162 is shown in FIG. 1B and described above.

Reinforcement component 120 may be coupled to planar top portion 116 of composite frame 110, while aircraft support beam 162 may be fastened to bottom support portion 114 of composite frame 110. Planar top portion 116 and bottom support portion 114 may be connected by leg portion 118 of composite frame 110. First radius 302 of the transition between planar top portion 116 and leg portion 118 may be at least about 0.25 inches or, more specifically, about 0.5 inches as described above. Second radius 304 of the transition between leg portion 118 and bottom support portion 114 may be at least about 0.25 inches or, more specifically, about 0.5 inches. Leg portion 118 may be angled relative to top planar portion 116 such that more fibers of second fibers 119b of composite frame 110 extend along the load transferred from seat 164 to aircraft support beam 162 than in any other direction. Angle 117 between leg portion 118 and top planar portion 116 may be between about 100° and 120° or, more specifically, about 110°.

Examples of Aircraft and Methods of Fabricating and Operation Aircraft

The illustrated embodiments provide novel aspects of composite seat tracks and methods of fabrication of such seat tracks. The embodiments find applicable uses in a wide variety of potential applications, including for example, in the aerospace industry. The disclosed method is ideally suited for seat tracks used in passenger aircrafts where the seat tracks experience significant loads.

Figure 8:
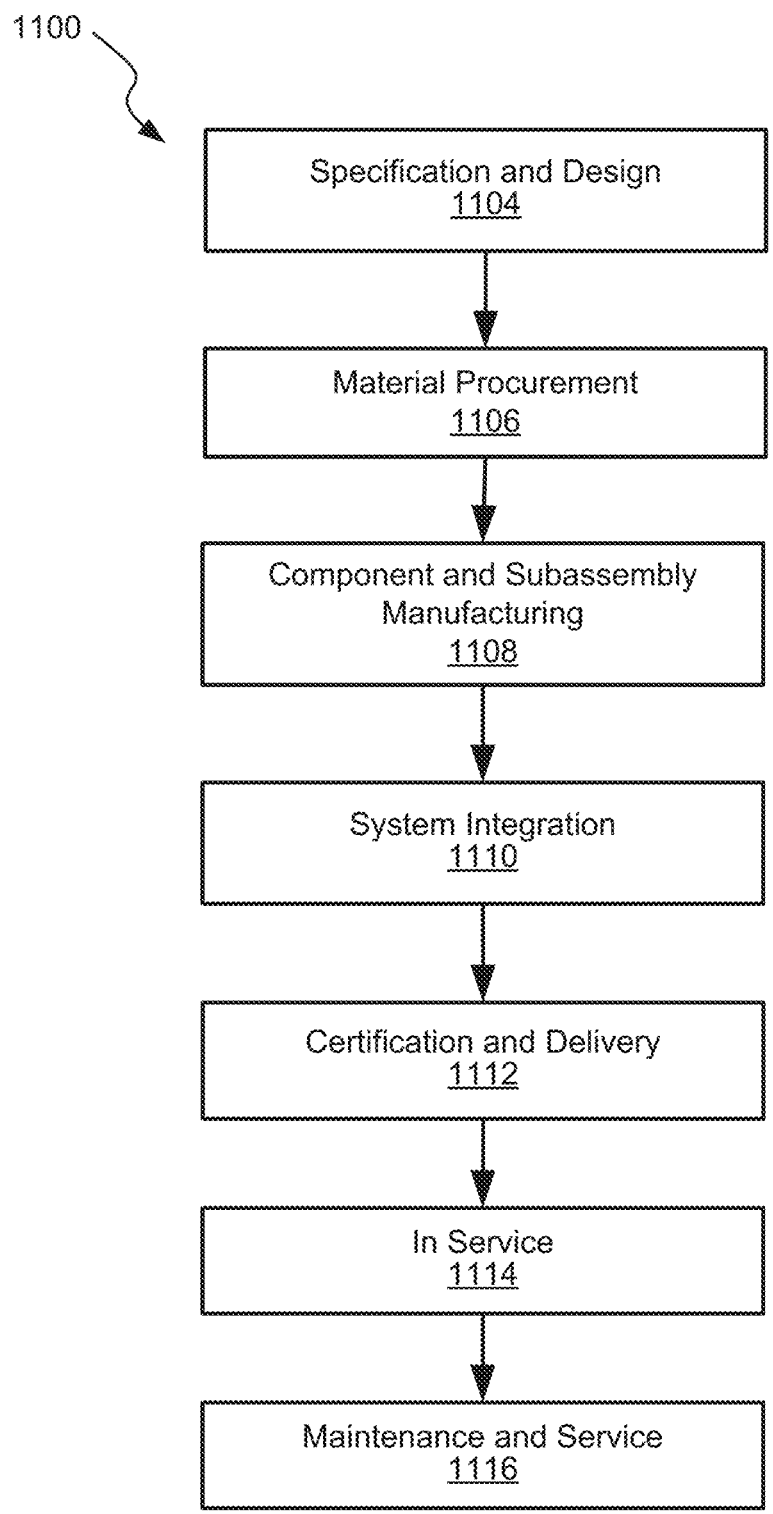
FIG. 8 is a block diagram of aircraft production and service methodology that may utilize end effectors described herein.
Figure 9:
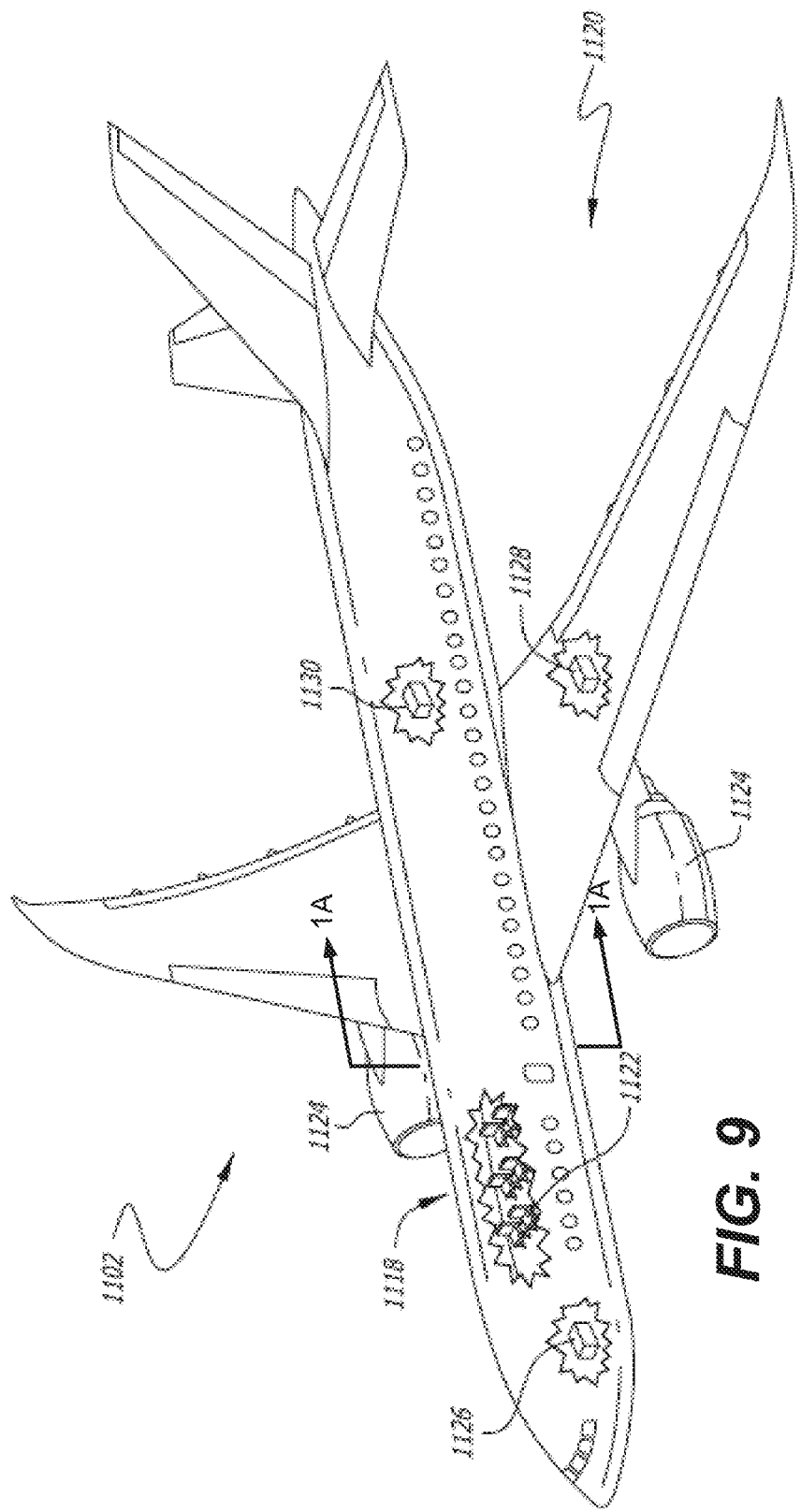
FIG. 9 is a schematic illustration of an aircraft that may include composite structures described herein.

Examples of the present disclosure may be described in the context of aircraft manufacturing and service method 1100 as shown in FIG. 8 and aircraft 1102 as shown in FIG. 9. During pre-production, method 1100 may include specification and design of aircraft 1102 as reflected by block 1104. Furthermore, method 1100 may include material procurement as reflected by block 1106. During production, component and subassembly manufacturing of aircraft 1102 as reflected by block 1108 as well as system integration of aircraft 1102 as reflected by block 1110 may take place. Composite seat tracks may be formed and used in during any one of these steps, e.g., specification and design (block 1104) of aircraft 1102, material procurement (block 1106), component and subassembly manufacturing (block 1108), and system integration (block 1110) of aircraft 1102. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of method 1100 may be performed or carried out by a system integrator, a third party, and/or an operator, e.g., a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, aircraft 1102 produced by method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (block 1108 and block 1110), for example, by substantially expediting assembly of or reducing the cost of aircraft 1102. Similarly, one or more examples of the apparatus or method realizations, or a combination thereof may be utilized, for example and without limitation, while aircraft 1102 is in service (block 1114) and/or during maintenance and service (block 1116).

Conclusion

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A seat track comprising:
a composite frame formed of first fibers and second fibers in a resin matrix, wherein the first fibers extend parallel to a principal axis of the seat track, and wherein the composite frame comprises:
a bottom support flange;
a top portion; and
a leg portion extending between the bottom support flange and the top portion, wherein the bottom support flange, the top portion, and the leg portion are monolithic such that a portion of the second fibers extends continuously through each of the bottom support flange, the top portion, and the leg portion.

2. The seat track of claim 1, wherein the second fibers extend within planes that are perpendicular to the principal axis of the seat track.

3. The seat track of claim 2, wherein a tensile strength of the composite frame in a direction of the principal axis is greater than a tensile strength of the composite frame in any direction within the planes that are perpendicular to the principal axis.

4. The seat track of claim 1, wherein the composite frame further comprises third fibers disposed at an angle of between about 30° to 60° relative to the first fibers and relative to the second fibers.

5. The seat track of claim 4, wherein an average fiber density of the third fibers within the composite frame is less than an average fiber density of the first fibers within the composite frame.

6. The seat track of claim 4, wherein an average fiber density of the third fibers within the composite frame is greater than an average fiber density of the second fibers within the composite frame.

7. The seat track of claim 4, wherein all of the third fibers are positioned between at least a portion of the first fibers and at least a portion of the second fibers along a thickness of the composite frame.

8. The seat track of claim 4, wherein the composite frame further comprises fourth fibers disposed at an angle of between about 30° to 60° relative to the first fibers and relative to the second fibers and perpendicular to the third fibers.

9. The seat track of claim 8, wherein an average fiber density of the fourth fibers is less than an average fiber density of the first fibers and greater than an average fiber density of the second fibers.

10. The seat track of claim 8, wherein an average fiber density of the fourth fibers is substantially similar to an average fiber density of the third fibers.

11. The seat track of claim 8, wherein the third fibers and the fourth fibers are parts of a woven fabric.

12. The seat track of claim 8, wherein all of the first fibers are disposed between the third fibers and the fourth fibers.

13. The seat track of claim 12, wherein all of the first fibers, the third fibers, and the fourth fibers are disposed between two sets of the second fibers having equal number of fibers in each of the two sets.

14. The seat track of claim 8, wherein all of the second fibers are disposed between the third fibers and the fourth fibers.

15. The seat track of claim 14, wherein all of the second fibers, the third fibers, and the fourth fibers are disposed between two sets of the first fibers having equal number of fibers in each of the two sets.

16. The seat track of claim 1, further comprising:
a reinforcement component attached to the composite frame, wherein the bottom support flange is substantially parallel to the top portion connected to the reinforcement component.

17. The seat track of claim 16, further comprising composite floor supports attached to the composite frame on opposite sides of the reinforcement component, wherein the composite floor supports comprise first fibers extending parallel to the principal axis and second fibers extending within planes substantially perpendicular to the principal axis.

18. The seat track of claim 17, wherein a tensile strength of the composite floor supports in a direction parallel to the principal axis is less than a tensile strength of the composite floor supports in a direction within planes substantially perpendicular to the principal axis.

19. The seat track of claim 17, wherein an average fiber density of the first fibers of the composite floor supports is less than an average fiber density of the second fibers of the composite floor supports.

20. The seat track of claim 17, wherein top surfaces of the composite floor supports are coplanar with a top surface of the reinforcement component, and wherein the composite floor supports are attached to the composite frame using adhesive and stitching.

* * * * *